United States Patent
Jung et al.

(10) Patent No.: US 10,256,666 B2
(45) Date of Patent: Apr. 9, 2019

(54) WIRELESS POWER TRANSFER METHOD, APPARATUS AND SYSTEM

(71) Applicant: LG ELECTRONICS INC., Seoul (KR)

(72) Inventors: Byungsang Jung, Seoul (KR); Hyunbeom Lee, Seoul (KR); Seonghun Lee, Seoul (KR); Yongcheol Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 279 days.

(21) Appl. No.: 15/101,826

(22) PCT Filed: Feb. 6, 2015

(86) PCT No.: PCT/KR2015/001245
§ 371 (c)(1),
(2) Date: Jun. 3, 2016

(87) PCT Pub. No.: WO2015/119456
PCT Pub. Date: Aug. 13, 2015

(65) Prior Publication Data
US 2016/0308397 A1    Oct. 20, 2016

Related U.S. Application Data

(60) Provisional application No. 61/978,592, filed on Apr. 11, 2014, provisional application No. 61/970,619, (Continued)

(30) Foreign Application Priority Data

Jan. 27, 2015 (KR) .......................... 10-2015-0012966

(51) Int. Cl.
*H02J 50/12* (2016.01)
*H02J 7/02* (2016.01)
*H02J 7/04* (2006.01)

(52) U.S. Cl.
CPC .............. *H02J 50/12* (2016.02); *H02J 7/025* (2013.01); *H02J 7/045* (2013.01)

(58) Field of Classification Search
CPC . H01F 38/14; H02J 50/12; H02J 7/025; H02J 7/045
See application file for complete search history.

(56) References Cited

U.S. PATENT DOCUMENTS

2011/0148215 A1    6/2011    Marzetta et al.
2012/0056486 A1    3/2012    Endo et al.
(Continued)

FOREIGN PATENT DOCUMENTS

| CN | 103427499 A | 12/2013 |
|---|---|---|
| JP | 2012-55157 A | 3/2012 |

(Continued)

*Primary Examiner* — Robert Deberadinis
(74) *Attorney, Agent, or Firm* — Birch, Stewart, Kolasch & Birch, LLP

(57) ABSTRACT

The present disclosure relates to a wireless power reception method, a wireless power reception apparatus, and a wireless charging system in a wireless power transmission and reception field, and the wireless power reception apparatus may include a power receiving unit configured to change a magnetic flux to a current to receive power in a wireless manner, and a power controller connected to the power receiving unit to change a resonant frequency to control power received from the power receiving unit, wherein the power controller includes a first capacitor, a second capacitor connected to the first capacitor in parallel, a first switch connected to the second capacitor in series to flow a current in a first direction, a second switch configured to flow a current in a second direction opposite to the first direction, and a switch controller configured to control the first and the second switch.

18 Claims, 14 Drawing Sheets

Related U.S. Application Data filed on Mar. 26, 2014, provisional application No. 61/936,889, filed on Feb. 7, 2014.

(56) References Cited

U.S. PATENT DOCUMENTS

| | | |
|---|---|---|
| 2012/0112555 A1 | 5/2012 | Toshimitsu et al. |
| 2013/0033118 A1 | 2/2013 | Karalis et al. |
| 2013/0270924 A1 | 10/2013 | Mori et al. |

FOREIGN PATENT DOCUMENTS

| | | |
|---|---|---|
| KR | 10-2013-0045934 A | 5/2013 |
| WO | WO 2014/018968 A2 | 1/2014 |

[Fig. 1]
[Fig. 2a]
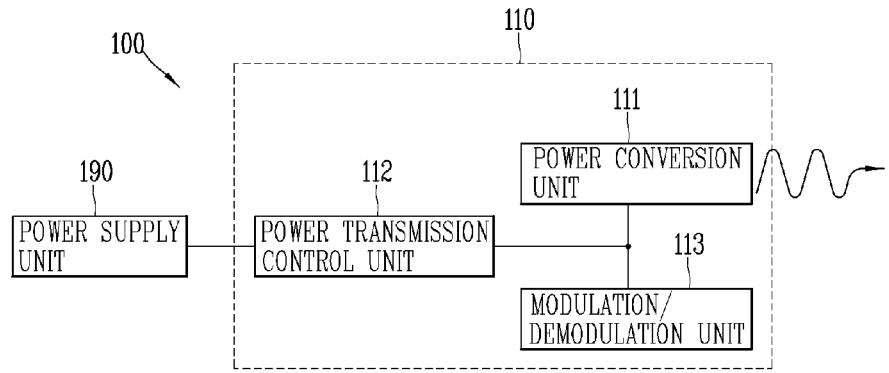
[Fig. 2b]
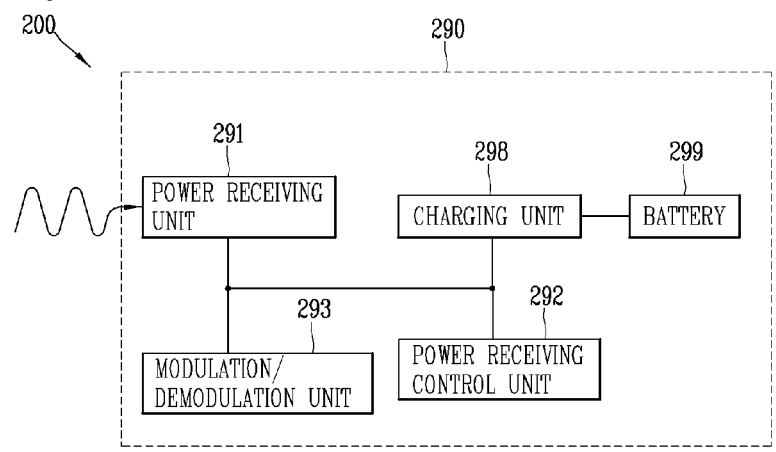
[Fig. 3]
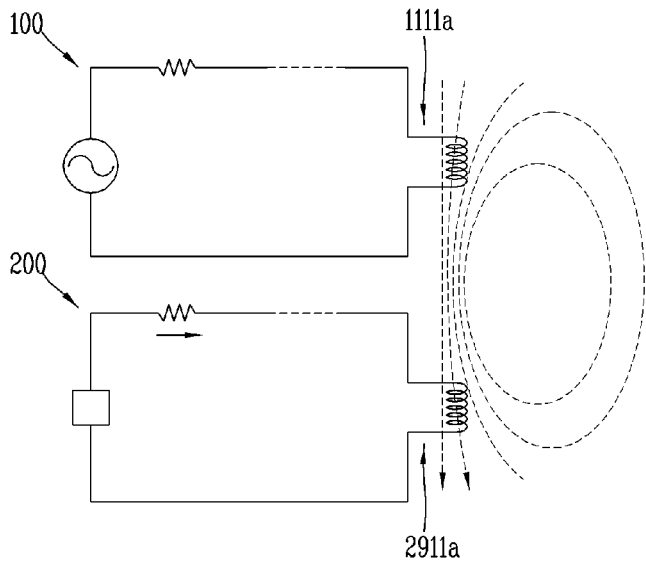

[Fig. 4a]
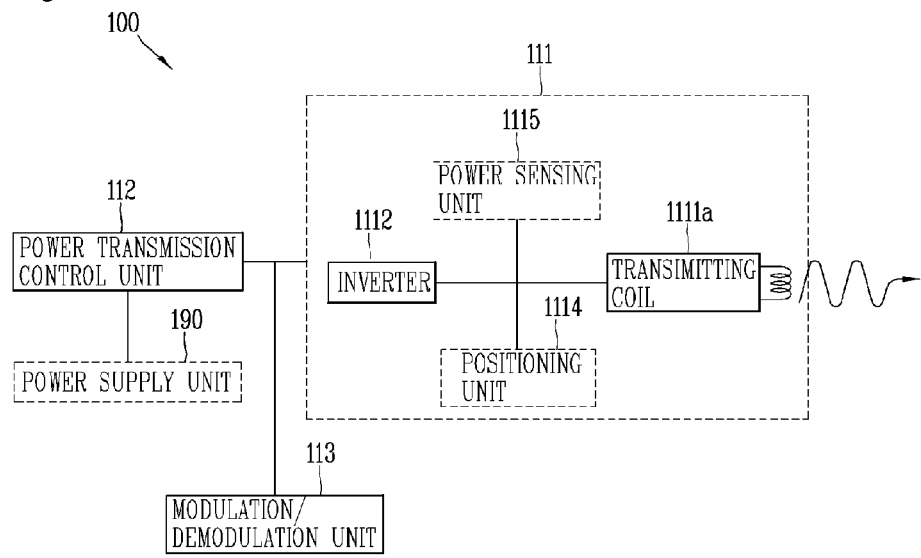
[Fig. 4b]
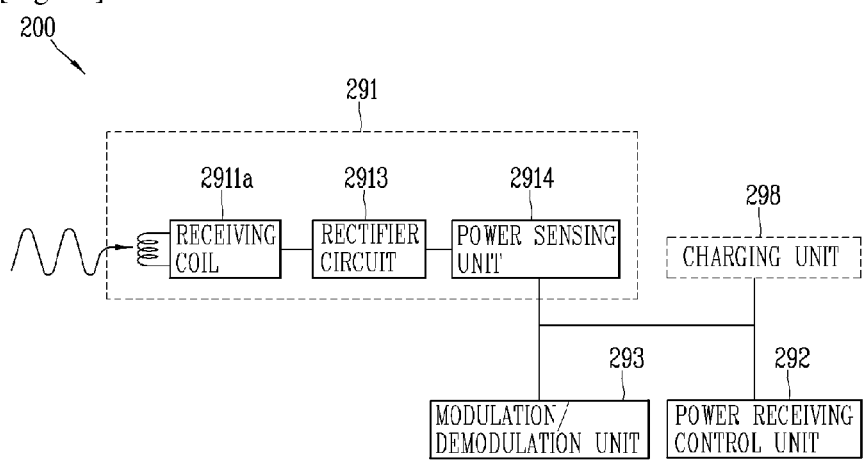
[Fig. 5]
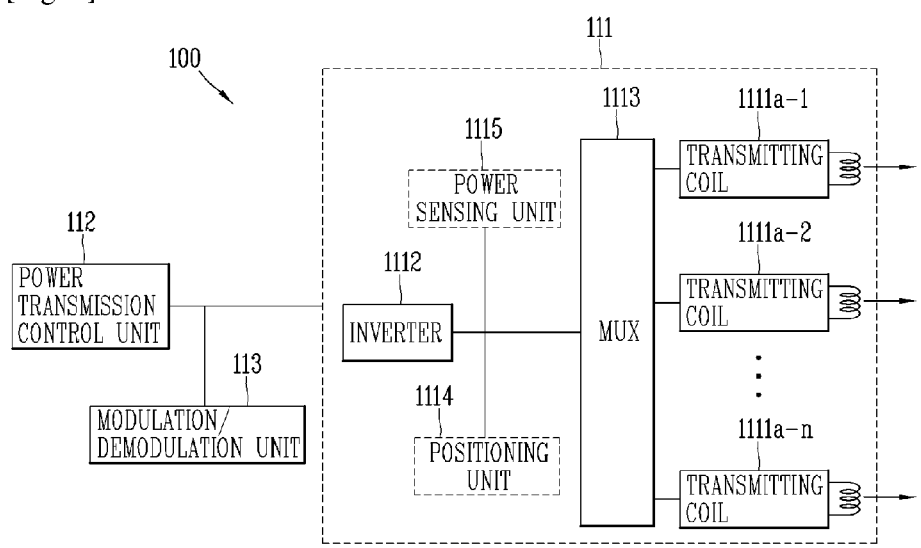

[Fig. 6]
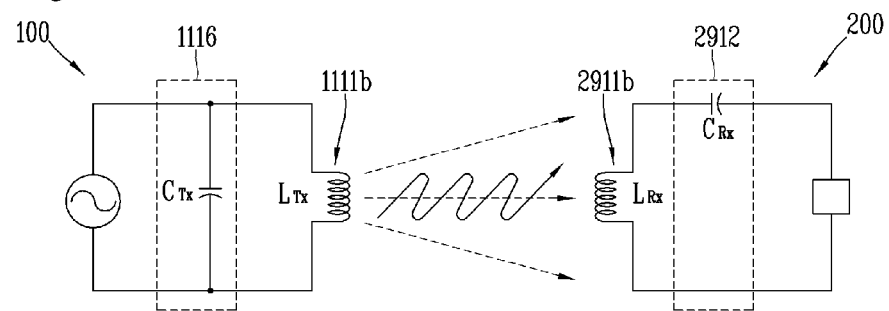
[Fig. 7a]
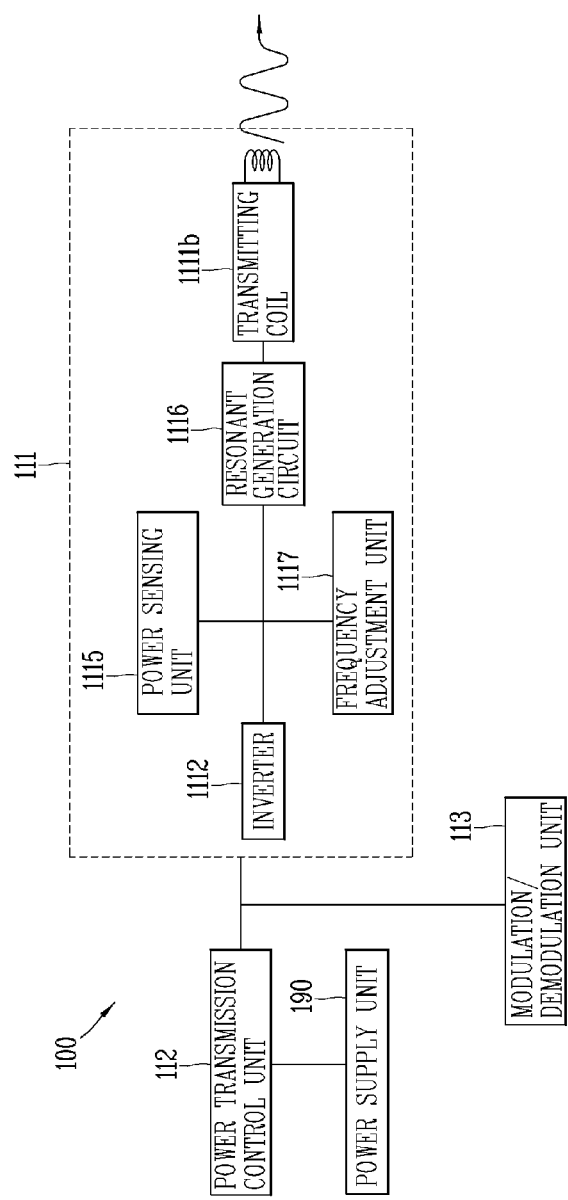

[Fig. 7b]
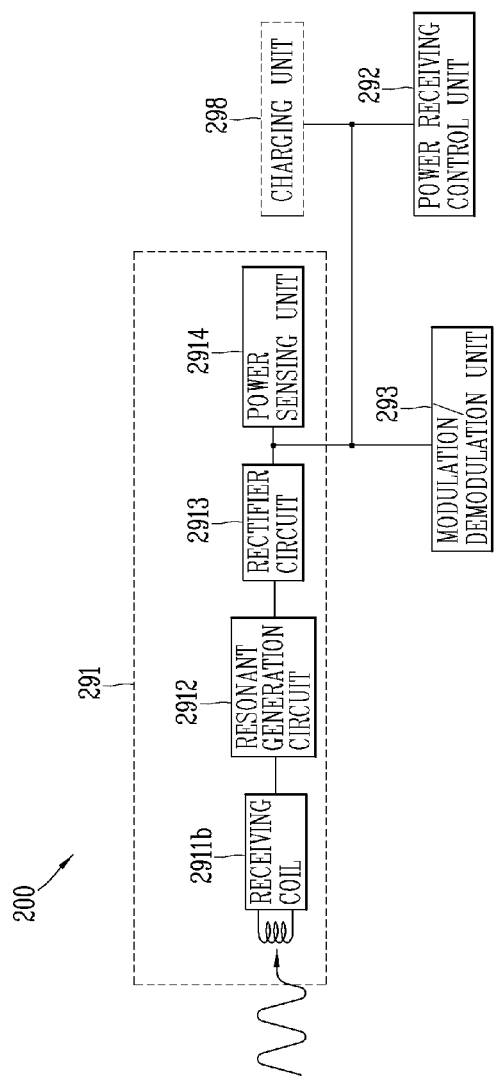

[Fig. 8]
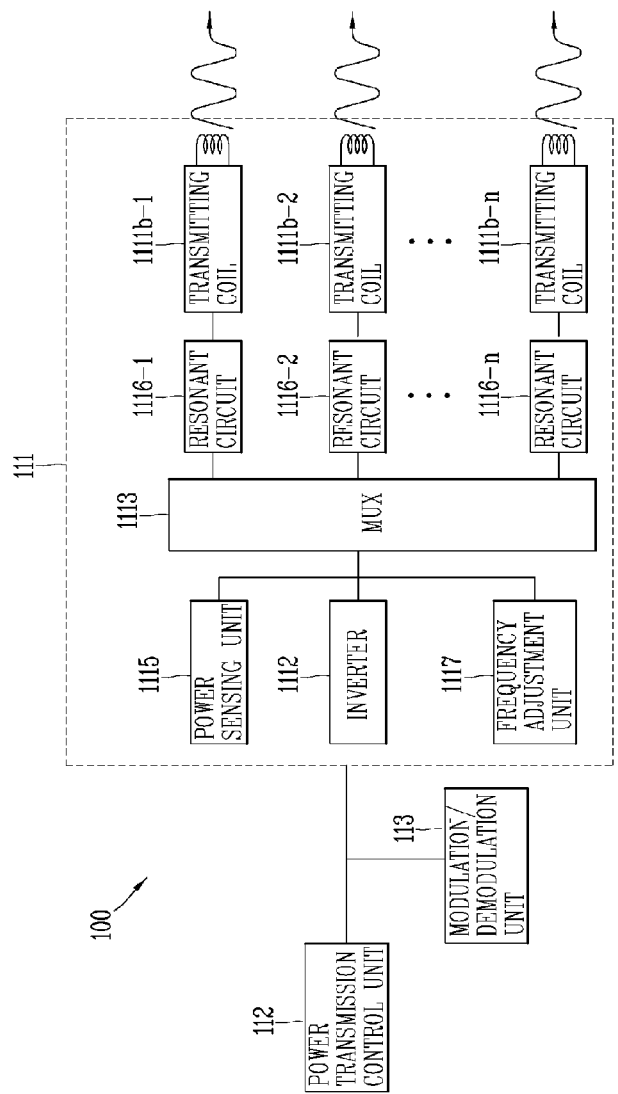
[Fig. 9]
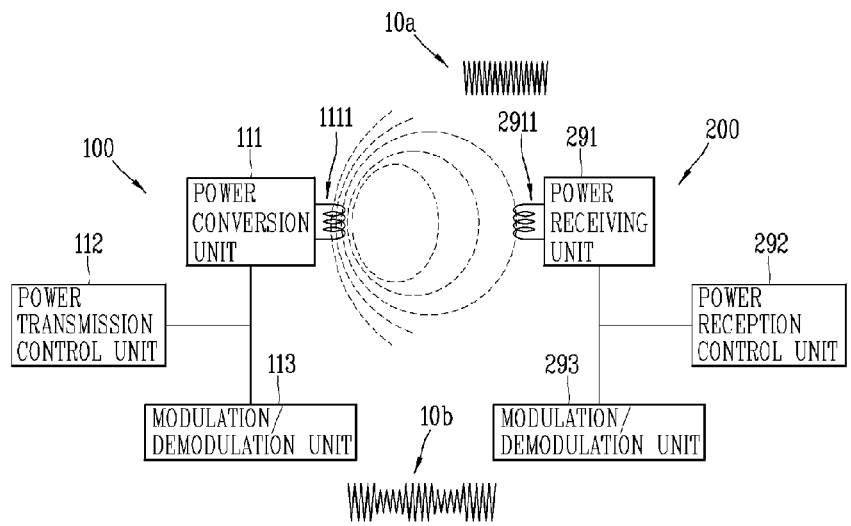

[Fig. 10]
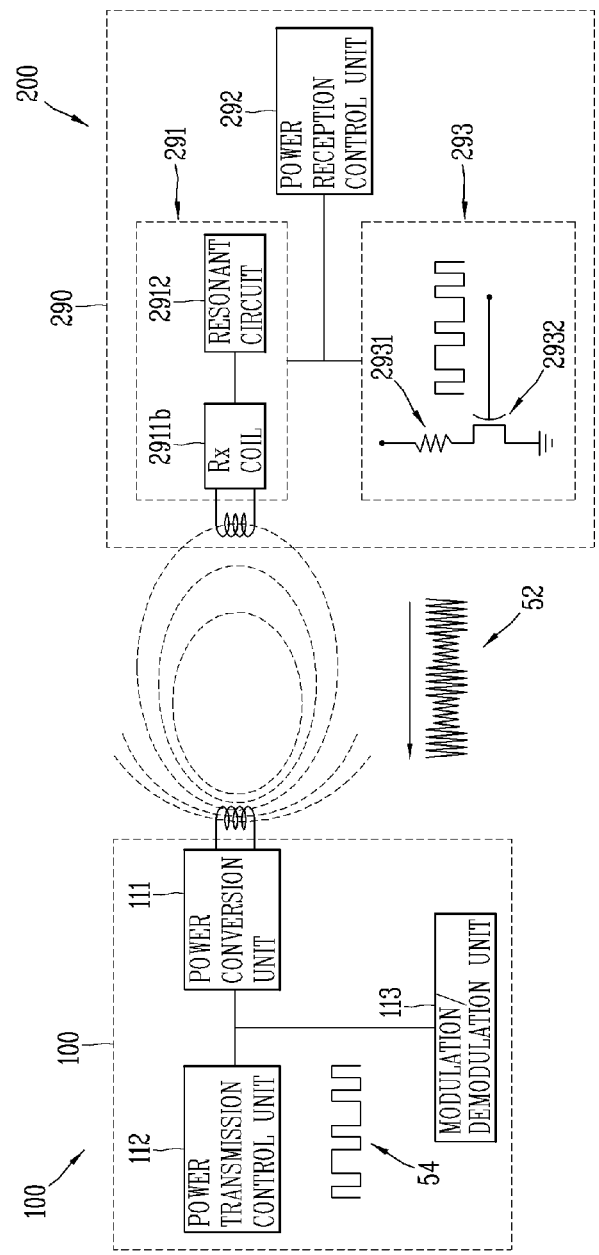
[Fig. 11a]
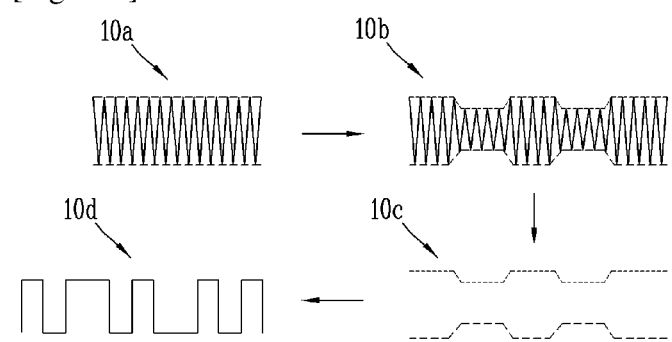

[Fig. 11b]
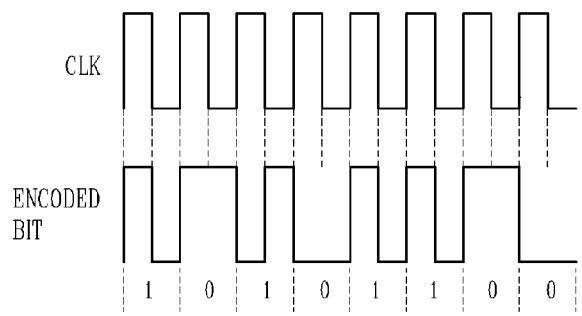
[Fig. 11c]
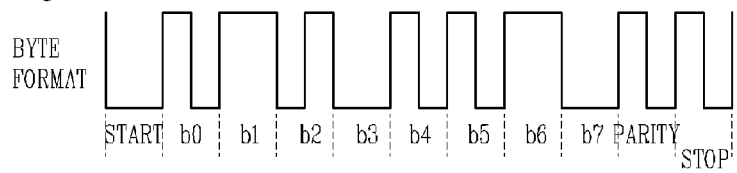
[Fig. 12a]
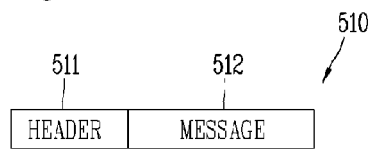
[Fig. 12b]
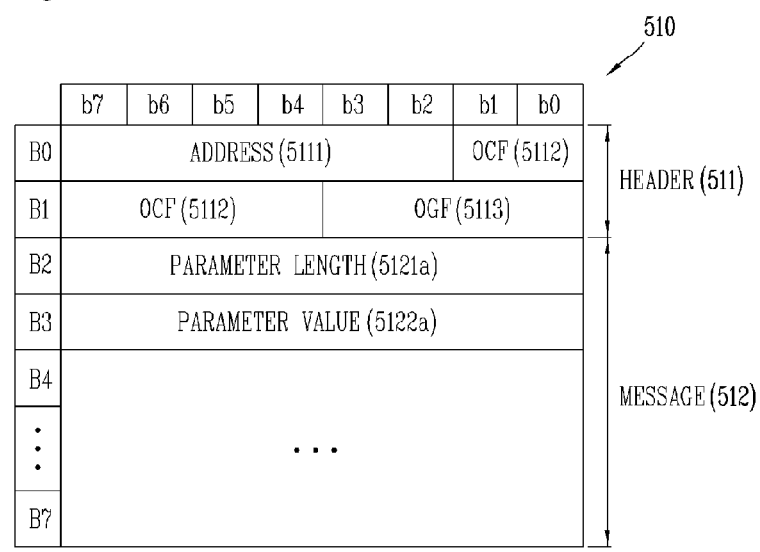
[Fig. 12c]
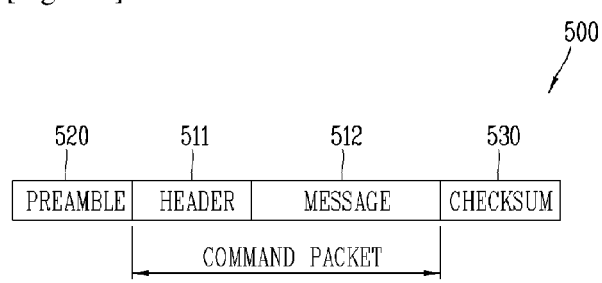

[Fig. 13]
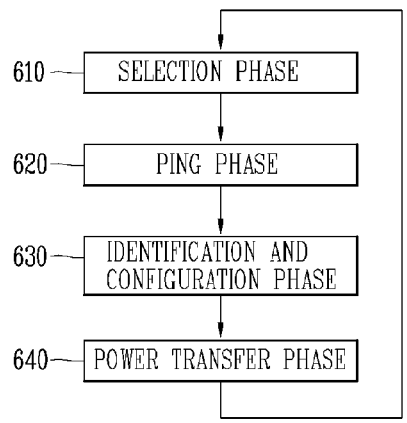
[Fig. 14]
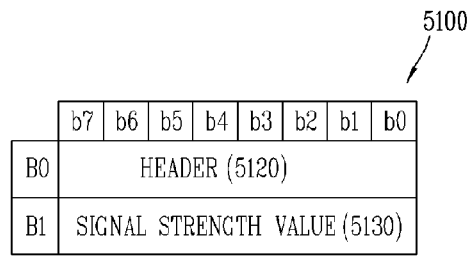
[Fig. 15a]
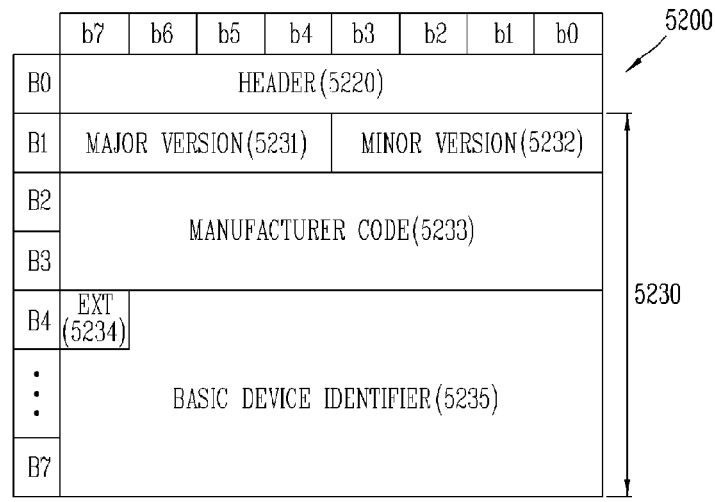
[Fig. 15b]
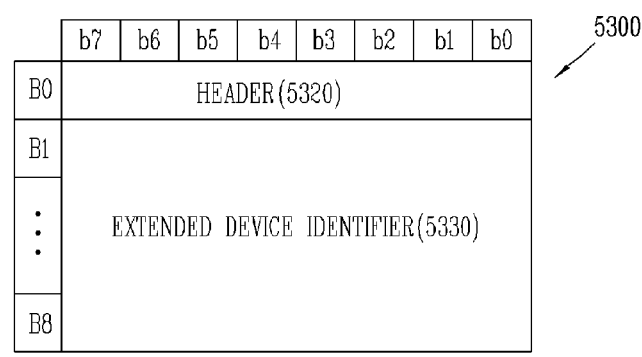

[Fig. 16]
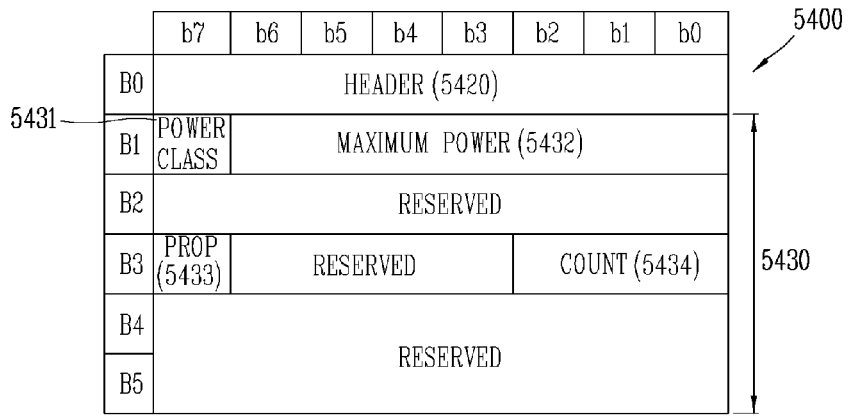
[Fig. 17]
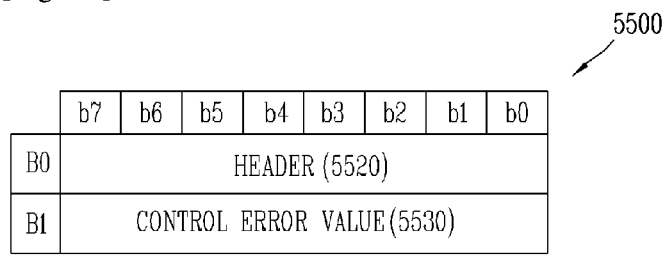
[Fig. 18]
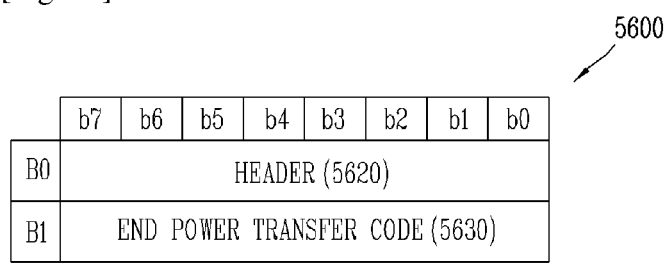

[Fig. 19]
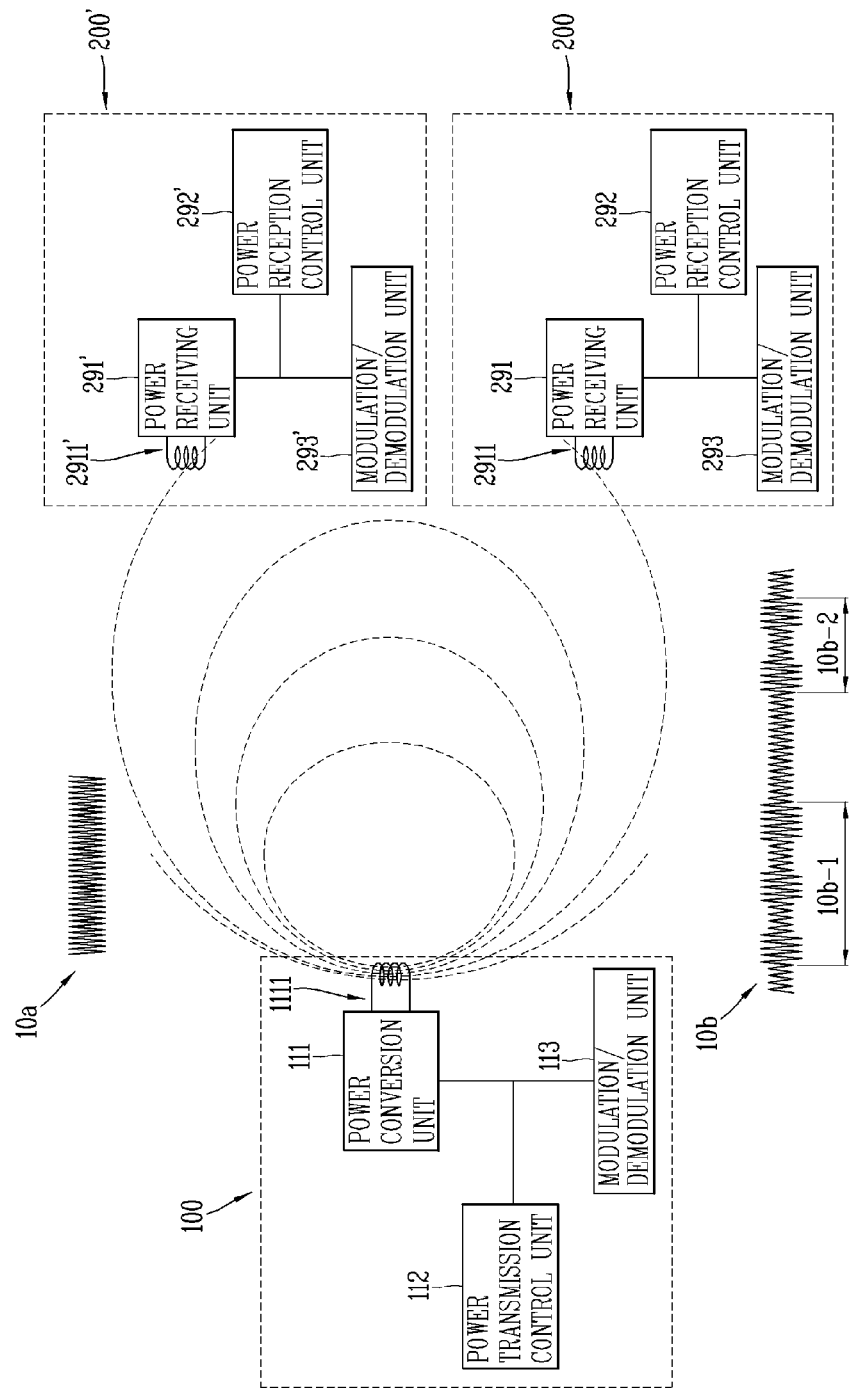
[Fig. 20]
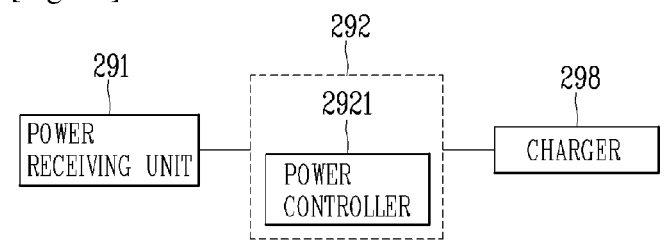

[Fig. 21a]
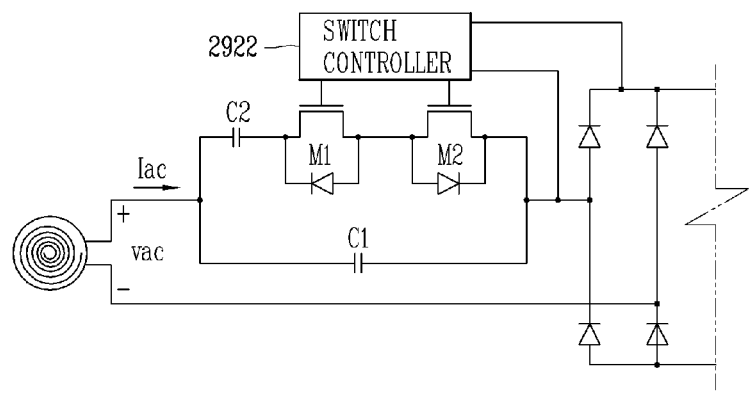
[Fig. 21b]
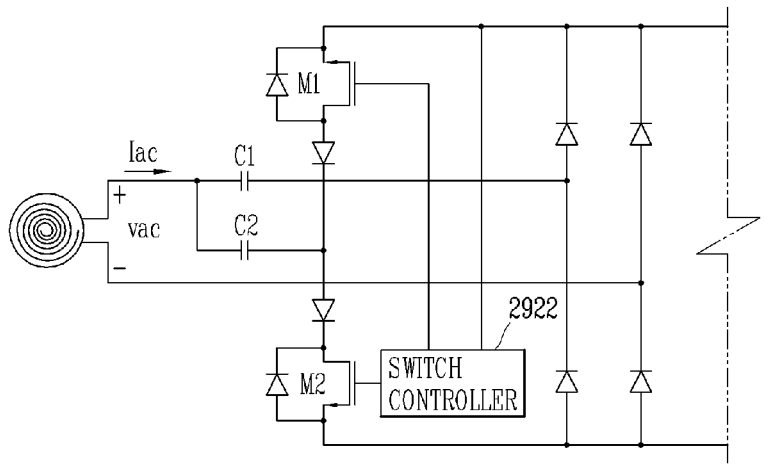

[Fig. 22]
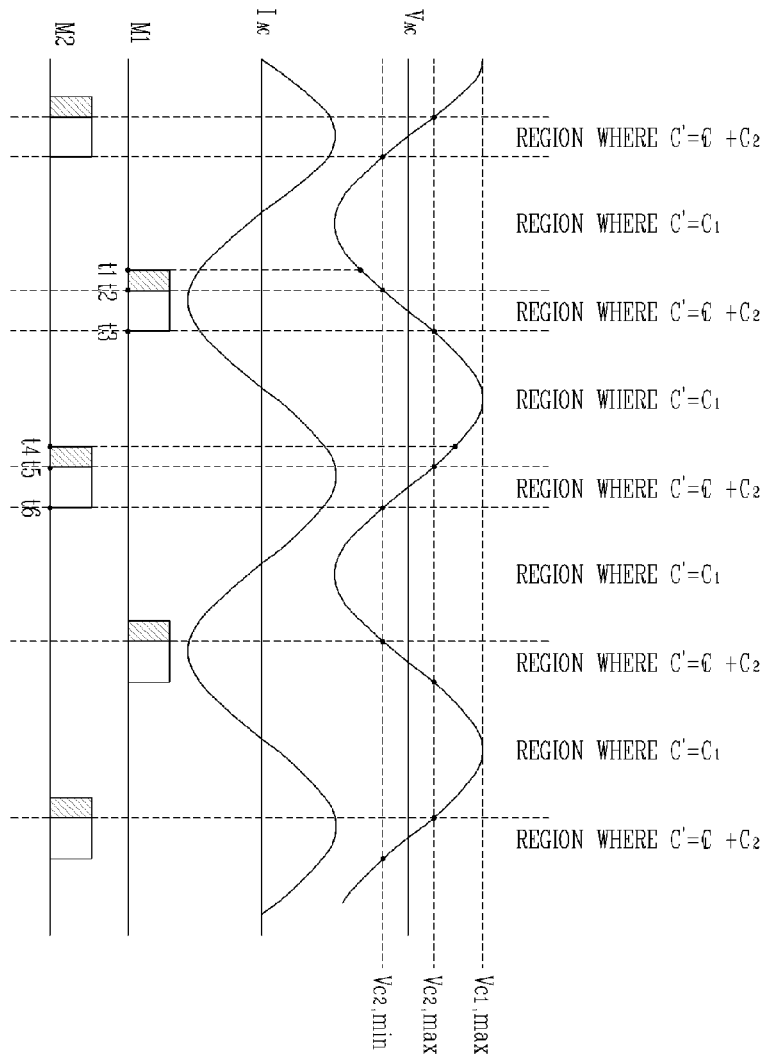
[Fig. 23]
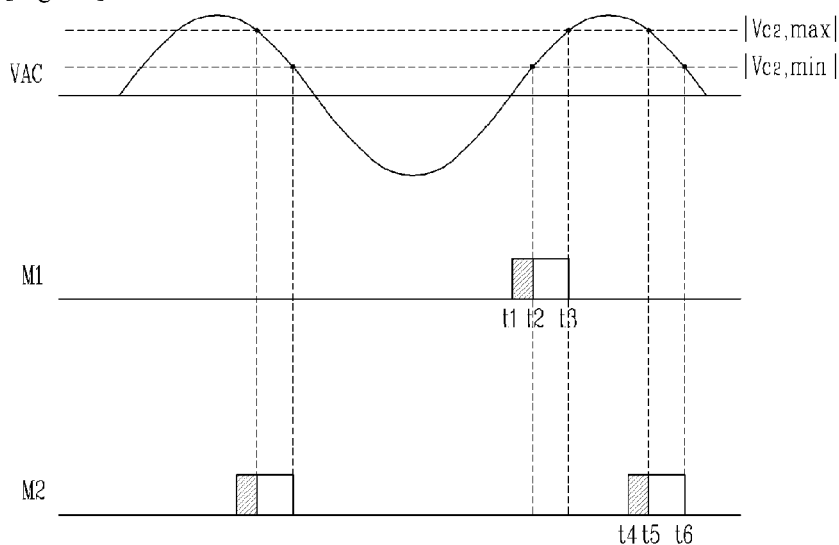

[Fig. 24]
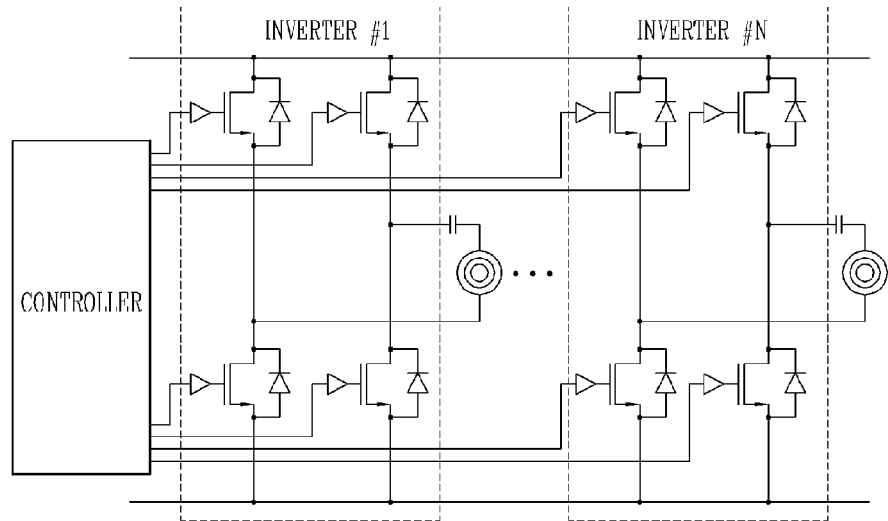
[Fig. 25]
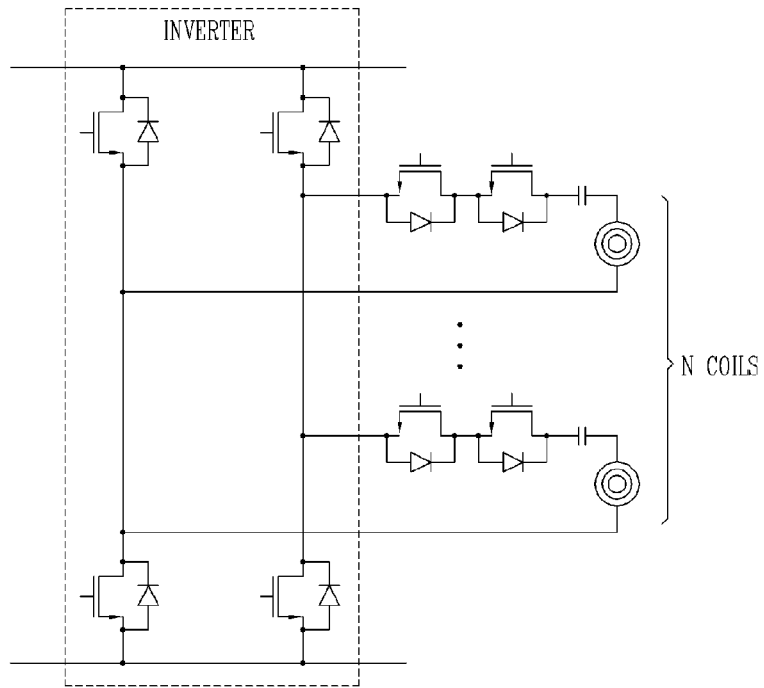
[Fig. 26]
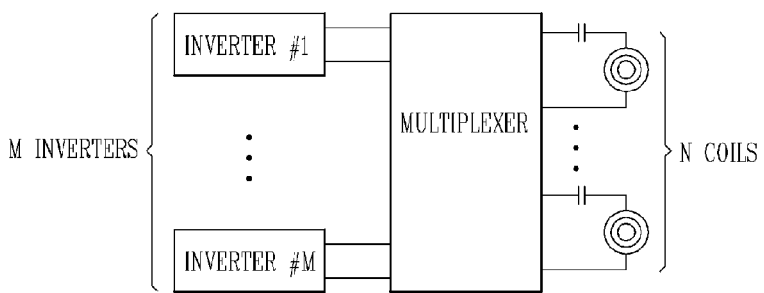

[Fig. 27]
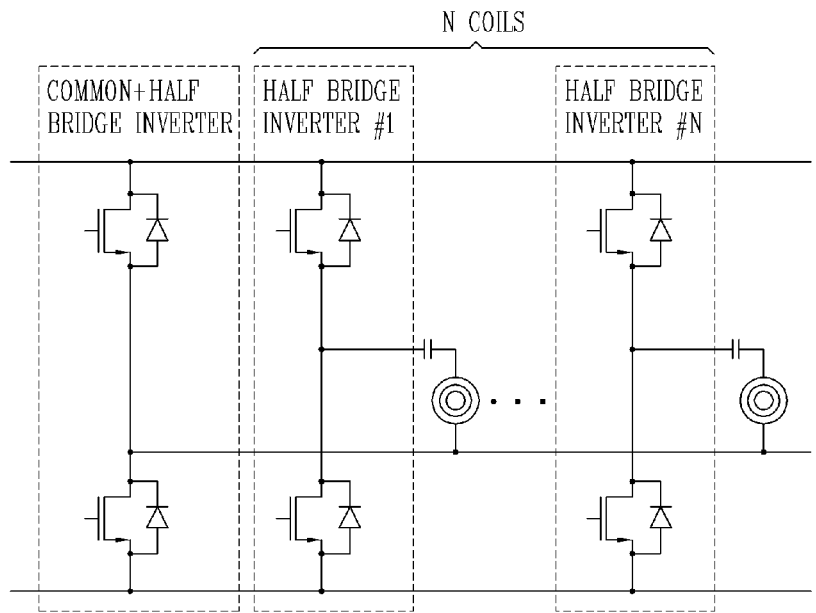
[Fig. 28]
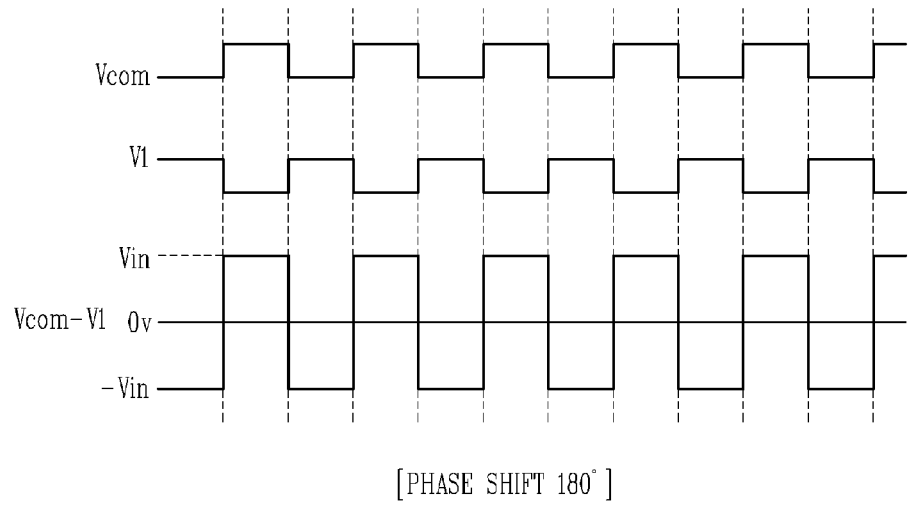
[PHASE SHIFT 180°]
[Fig. 29]
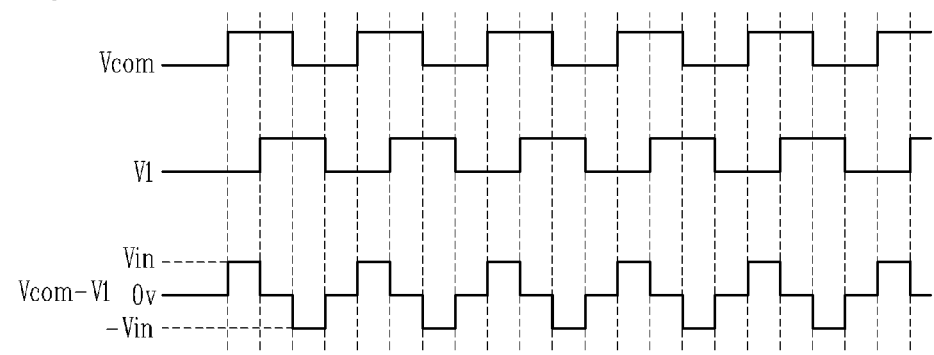

WIRELESS POWER TRANSFER METHOD, APPARATUS AND SYSTEM

CROSS REFERENCE TO RELATED APPLICATIONS

This application is the National Phase of PCT/KR2015/001245 filed on Feb. 6, 2015, which claims priority under 35 U.S.C. § 119(e) to U.S. Provisional Application Nos. 61/936,889 filed on Feb. 7, 2014; 61/970,619 filed on Mar. 26, 2014; 61/978,592 filed on Apr. 11, 2014; and under 35 U.S.C. § 119(a) to Korean Patent Application No. 10-2015-0012966 filed in Korea on Jan. 27, 2015, all of which are hereby expressly incorporated by reference into the present application.

TECHNICAL FIELD

The present disclosure relates to a wireless power reception method, a wireless power reception apparatus, and a wireless charging system in a wireless power transmission and reception field.

BACKGROUND ART

In recent years, the method of contactlessly supplying electrical energy to wireless power receivers in a wireless manner has been used instead of the traditional method of supplying electrical energy in a wired manner. The wireless power receiver receiving energy in a wireless manner may be directly driven by the received wireless power, or a battery may be charged by using the received wireless power, then allowing the wireless power receiver to be driven by the charged power.

For allowing smooth wireless power transfer between a wireless power transmitter which transmits power in a wireless manner and a wireless power receiver which receives power in a wireless manner, the standardization for a technology related to the wireless power transfer is undergoing.

As part of the standardization for the wireless power transfer technology, the Wireless Power Consortium (WPC) which manages technologies for a magnetic inductive wireless power transfer has published a standard document "System description Wireless Power Transfer, Volume 1, Low Power, Part 1: Interface Definition, Version 1.00 Release Candidate 1 (RC1)" for interoperability in the wireless power transfer on Apr. 12, 2010.

On the other hand, Power Matters Alliance as another technology standardization consortium has been established on March 2012, developed a product line of interface standards, and published a standard document based on an inductive coupling technology for providing inductive and resonant power.

A wireless charging method using electromagnetic induction is frequently encountered in our lives, and for example, wireless charging method using electromagnetic induction is utilized by being commercialized in electric toothbrushes, wireless coffee ports and the like.

In recent years, in addition to a method of transmitting wireless power in a one-to-one manner in the related art, a method of allowing one wireless power transmitter to transmit power to a plurality of wireless power receivers has been developed.

Though a wireless power transmitter changes an operating frequency or operating voltage of wireless power to control power in the related art, it causes a problem in controlling power for each wireless power receiver when transmitting power to a plurality of wireless power receiver at the same time.

Accordingly, the present disclosure proposes a method of controlling power in a wireless power receiver and a method of controlling power using a variable capacitor.

DISCLOSURE OF INVENTION

Technical Problem

An aspect of the present disclosure is to provide a method of electrically implementing a variable capacitor.

Furthermore, another aspect of the present disclosure is to prevent overcurrent when implementing a variable capacitor.

In addition, still another object of the present disclosure is to provide a method of controlling power in a wireless power receiver or wireless power transmitter.

Solution to Problem

There is disclosed a wireless power receiver for receiving power in a wireless manner, the wireless power receiver, including a power receiving unit configured to change a magnetic flux to a current to receive power in a wireless manner, and a power controller connected to the power receiving unit to determine a resonant frequency to control power received from the power receiving unit, wherein the power controller includes a first capacitor, a variable capacitor unit including a first switch and a second switch connected to a second capacitor in series, and connected to the first capacitor in parallel, and a switch controller connected to the first and the second switch to control the first and the second switch, and the switch controller controls the first and the second switch to allow an equivalent capacitor value corresponding to the variable capacitor unit and the first capacitor to have a capacitor value corresponding to the determined resonant frequency.

According to an embodiment, the switch controller may adjust an effective duty of the first and the second switch to have a capacitor value corresponding to a preset resonant frequency.

According to an embodiment, an equivalent capacitor value calculated using the first and the second capacitor may increase based on the effective duty of the first and the second switch being lengthened, and the equivalent capacitor value may decrease based on the effective duty of the first and the second switch being shortened.

According to an embodiment, the switch controller may close the first switch during at least part of a section in which a voltage of the first capacitor increases, and close the second switch during at least part of a section in which a voltage of the first capacitor decreases.

According to an embodiment, an effective duty of the first and the second switch may include a time point at which a voltage value of the first capacitor becomes zero.

According to an embodiment, a time point at which either one of the first and the second switch is closed may be a time point at which an absolute value of the voltage of the first capacitor has a larger value than that of the voltage of the second capacitor.

According to an embodiment, the switch controller may close the first and the second switch at a time point prior to a time point indicating the effective duty of the first and the second switch.

There is disclosed a control method of a wireless power receiver configured to receive power in a wireless manner, and including a first capacitor, a second capacitor connected to the first capacitor in parallel, a first switch and a second switch, and the method may include receiving wireless power having a specific operating frequency through a power receiving unit from a wireless power transmitter, calculating a resonant frequency to receive at least part of the received power through a power controller, detecting a capacitor value corresponding to the resonant frequency to allow the wireless power receiver to have the resonant frequency, detecting an effective duty value of a first switch and a second switch connected to the second capacitor in series to allow an equivalent capacitor value calculated using the first capacitor and the second capacitor to have the detected capacitor value, and controlling the first and the second switch based on the effective duty value.

According to an embodiment, said controlling the first and the second switch may control the first and the second switch to open the first and the second switch prior to a time section occupied by the effective duty.

There is disclosed a wireless power transmitter for transmitting power in a wireless manner, and the wireless power transmitter may include a power transmission unit having a plurality of coils configured to change a current to a magnetic flux to transmit power in a wireless manner, a plurality of sub-half bridges connected to the plurality of coils, respectively, and a main half bridge connected to all the plurality of sub-half bridges, and a power transmission controller configured to control at least one coil to transmit power to a wireless power receiver using at least one of the plurality of coils, wherein the power transmission controller performs a phase shifted full bridge control using at least one sub-half bridge connected to the at least one coil and the main half bridge.

According to an embodiment, the power transmission controller may control power through a phase difference of voltage applied to the sub-half bridge based on a reference voltage applied to the main half bridge.

According to an embodiment, the power transmission controller may transmit maximum power to the wireless power receiver when a voltage applied to the main half bridge and a voltage applied to the sub-half bridge have a phase difference of 180 degrees.

According to an embodiment, a voltage applied to the sub-half bridge may be determined by an amount of power transmitted from a coil connected to the sub-half bridge.

According to an embodiment, the power transmission controller may control voltages applied to a plurality of sub-half bridges connected to the at least one coil to have different voltages.

According to an embodiment, the power transmission controller may control a sub-half bridge to allow a voltage applied to the sub-half bridge connected to a coil that does not transmit power among the plurality of coils to have the same phase as a reference voltage applied to the main half bridge.

Advantageous Effects of Invention when the number of coils constituting the power transmission unit is N, the present disclosure may individually control a plurality of coils with only the number of switches, 2N+2. In other words, the present disclosure may individually control each coil, thereby providing different power to a plurality of wireless power receivers, respectively, at the same time.

Furthermore, the present disclosure may reduce the number of switches through the main half bridge, thereby increasing its power efficiency.

Furthermore, the present disclosure may prevent an overcurrent from flowing through an inductor through a body diode included in a switch constituting a sub-half bridge.

BRIEF DESCRIPTION OF DRAWINGS

FIG. 1 is an exemplary view conceptually illustrating a wireless power transmitter and a wireless power receiver according to the embodiments of the present invention.

FIGS. 2A and 2B are exemplary block diagrams illustrating the configuration of a wireless power transmitter and a wireless power receiver that can be employed in the embodiments disclosed herein, respectively.

FIG. 3 is a view illustrating a concept in which power is transferred from a wireless power transmitter to a wireless power receiver in a wireless manner according to an inductive coupling method.

FIGS. 4A and 4B are block diagrams illustrating part of the wireless power transmitter and wireless power receiver in a magnetic induction method that can be employed in the embodiments disclosed herein.

FIG. 5 is a block diagram illustrating a wireless power transmitter configured to have one or more transmitting coils receiving power according to an inductive coupling method that can be employed in the embodiments disclosed herein.

FIG. 6 is a view illustrating a concept in which power is transferred to a wireless power receiver from a wireless power transmitter in a wireless manner according to a resonance coupling method.

FIGS. 7A and 7B are block diagrams illustrating part of the wireless power transmitter and wireless power receiver in a resonance method that can be employed in the embodiments disclosed herein.

FIG. 8 is a block diagram illustrating a wireless power transmitter configured to have one or more transmitting coils receiving power according to a resonance coupling method that can be employed in the embodiments disclosed herein.

FIG. 9 a view illustrating a concept of transmitting and receiving a packet between a wireless power transmitter and an electronic device through the modulation and demodulation of a wireless power signal in transferring power in a wireless manner according to the embodiments disclosed herein.

FIG. 10 is a view illustrating a configuration of transmitting and receiving a power control message in transferring power in a wireless manner according to the embodiments disclosed herein.

FIGS. 11A, 11B and 11C illustrate signal forms in modulation and demodulation executed in a wireless power transfer according to the embodiments disclosed herein.

FIGS. 12A, 12B and 12C illustrate a packet including a power control message used in a wireless power transfer method according to the embodiments disclosed herein.

FIG. 13 is a view illustrating operation phases of the wireless power transmitter and wireless power receiver according to the embodiments disclosed herein.

FIGS. 14 to 18 are views illustrating the structure of packets including a power control message between the wireless power transmitter 100 and the wireless power receiver.

FIG. 19 is a conceptual view illustrating a method of transferring power to at least one wireless power receiver from a wireless power transmitter.

FIG. 20 is a block diagram illustrating the configuration of a wireless power receiver according to an embodiment of the present disclosure.

FIGS. 21A and 21B are circuit diagrams illustrating different circuit structures in a wireless power receiver according to an embodiment of the present disclosure.

FIGS. 22 and 23 are conceptual views illustrating a switching mode for power control according to an embodiment of the present disclosure.

FIGS. 24, 25 and 26 are conventional circuit diagrams proposed to change an operating frequency in a wireless power transmitter having a plurality of coils.

FIG. 27 is a circuit diagram proposed to change an operating frequency in a wireless power transmitter having a plurality of coils according to the present disclosure.

FIGS. 28 and 29 are conceptual views illustrating the driving of the circuit in FIG. 27.

MODE FOR THE INVENTION

The technologies disclosed herein may be applicable to wireless power transfer (or wireless power transmission). However, the technologies disclosed herein are not limited to this, and may be also applicable to all kinds of power transmission systems and methods, wireless charging circuits and methods to which the technological spirit of the technology can be applicable, in addition to the methods and apparatuses using power transmitted in a wireless manner.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

In addition, a suffix "module" or "unit" used for constituent elements disclosed in the following description is merely intended for easy description of the specification, and the suffix itself does not give any special meaning or function.

Furthermore, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

Definition

Many-to-one communication: communicating between one transmitter (Tx) and many receivers (Rx)

Unidirectional communication: transmitting a required message only from a receiver to a transmitter Bidirectional communication: allowing message transmission from a transmitter to a receiver and from the receiver to the transmitter, namely, at both sides Here, the transmitter and the receiver indicate the same as a transmitting unit (device) and a receiving unit (device), respectively. Hereinafter, those terms may be used together.

Conceptual View of Wireless Power Transmitter and Wireless Power Receiver

FIG. 1 is an exemplary view conceptually illustrating a wireless power transmitter and a wireless power receiver according to the embodiments of the present invention.

Referring to FIG. 1, a wireless power transmitter 100 may be a power transfer apparatus configured to transfer power required for a wireless power receiver 200 in a wireless manner.

Furthermore, the wireless power transmitter 100 may be a wireless charging apparatus configured to charge a battery of the wireless power receiver 200 by transferring power in a wireless manner.

Additionally, the wireless power transmitter 100 may be implemented with various forms of apparatuses transferring power to the wireless power receiver 200 requiring power in a contactless state.

The wireless power receiver 200 is a device that is operable by receiving power from the wireless power transmitter 100 in a wireless manner. Furthermore, the wireless power receiver 200 may charge a battery using the received wireless power.

On the other hand, the wireless power receiver for receiving power in a wireless manner as described herein should be construed broadly to include a portable phone, a cellular phone, a smart phone, a personal digital assistant (PDA), a portable multimedia player (PMP), a tablet, a multimedia device, or the like, in addition to an input/output device such as a keyboard, a mouse, an audio-visual auxiliary device, and the like.

The wireless power receiver 200, as described later, may be a mobile communication terminal (for example, a portable phone, a cellular phone, a tablet and the like) or a multimedia device.

On the other hand, the wireless power transmitter 100 may transfer power in a wireless manner without mutual contact to the wireless power receiver 200 using one or more wireless power transfer methods. In other words, the wireless power transmitter 100 may transfer power using at least one of an inductive coupling method based on magnetic induction phenomenon by the wireless power signal and a magnetic resonance coupling method based on electromagnetic resonance phenomenon by a wireless power signal at a specific frequency.

Wireless power transfer in the inductive coupling method is a technology transferring power in a wireless manner using a primary coil and a secondary coil, and refers to the transmission of power by inducing a current from a coil to another coil through a changing magnetic field by a magnetic induction phenomenon.

Wireless power transfer in the inductive coupling method refers to a technology in which the wireless power receiver 200 generates resonance by a wireless power signal transmitted from the wireless power transmitter 100 to transfer power from the wireless power transmitter 100 to the wireless power receiver 200 by the resonance phenomenon.

Hereinafter, the wireless power transmitter 100 and wireless power receiver 200 according to the embodiments disclosed herein will be described in detail. In assigning reference numerals to the constituent elements in each of the following drawings, the same reference numerals will be used for the same constituent elements even though they are shown in a different drawing.

FIGS. 2A and 2B are exemplary block diagrams illustrating the configuration of a wireless power transmitter 100 and a wireless power receiver 200 that can be employed in the embodiments disclosed herein.

Wireless Power Transmitter

Referring to FIG. 2A, the wireless power transmitter 100 may include a power transmission unit 110. The power transmission unit 110 may include a power conversion unit 111 and a power transmission control unit 112.

The power conversion unit 111 transfers power supplied from a transmission side power supply unit 190 to the wireless power receiver 200 by converting it into a wireless power signal. The wireless power signal transferred by the power conversion unit 111 is generated in the form of a magnetic field or electro-magnetic field having an oscillation characteristic. For this purpose, the power conversion unit 111 may be configured to include a coil for generating the wireless power signal.

The power conversion unit 111 may include a constituent element for generating a different type of wireless power signal according to each power transfer method. For example, the power conversion unit 111 may include a primary coil for forming a changing magnetic field to induce a current to a secondary coil of the wireless power receiver 200. Furthermore, the power conversion unit 111 may include a coil (or antenna) for forming a magnetic field having a specific resonant frequency to generate a resonant frequency in the wireless power receiver 200 according to the resonance coupling method.

Furthermore, the power conversion unit 111 may transfer power using at least one of the foregoing inductive coupling method and the resonance coupling method.

Among the constituent elements included in the power conversion unit 111, those for the inductive coupling method will be described later with reference to FIGS. 4 and 5, and those for the resonance coupling method will be described with reference to FIGS. 7 and 8.

On the other hand, the power conversion unit 111 may further include a circuit for controlling the characteristics of a used frequency, an applied voltage, an applied current or the like to form the wireless power signal.

The power transmission control unit 112 controls each of the constituent elements included in the power transmission unit 110. The power transmission control unit 112 may be implemented to be integrated into another control unit (not shown) for controlling the wireless power transmitter 100.

On the other hand, a region which the wireless power signal can be approached may be divided into two types. First, an active area denotes a region through which a wireless power signal transferring power to the wireless power receiver 200 is passed. Next, a semi-active area denotes an interest region in which the wireless power transmitter 100 can detect the existence of the wireless power receiver 200. Here, the power transmission control unit 112 may detect whether the wireless power receiver 200 is placed in the active area or detection area or removed from the area. Specifically, the power transmission control unit 112 may detect whether or not the wireless power receiver 200 is placed in the active area or detection area using a wireless power signal formed from the power conversion unit 111 or a sensor separately provided therein. For instance, the power transmission control unit 112 may detect the presence of the wireless power receiver 200 by monitoring whether or not the characteristic of power for forming the wireless power signal is changed by the wireless power signal, which is affected by the wireless power receiver 200 existing in the detection area. However, the active area and detection area may vary according to the wireless power transfer method such as an inductive coupling method, a resonance coupling method, and the like.

The power transmission control unit 112 may perform the process of identifying the wireless power receiver 200 or determine whether to start wireless power transfer according to a result of detecting the existence of the wireless power receiver 200.

Furthermore, the power transmission control unit 112 may determine at least one characteristic of a frequency, a voltage, and a current of the power conversion unit 111 for forming the wireless power signal. The determination of the characteristic may be carried out by a condition at the side of the wireless power transmitter 100 or a condition at the side of the wireless power receiver 200.

The power transmission control unit 112 may receive a power control message from the wireless power receiver 200. The power transmission control unit 112 may determine at least one characteristic of a frequency, a voltage and a current of the power conversion unit 111 based on the received power control message, and additionally perform other control operations based on the power control message.

For example, the power transmission control unit 112 may determine at least one characteristic of a frequency, a voltage and a current used to form the wireless power signal according to the power control message including at least one of rectified power amount information, charging state information and identification information in the wireless power receiver 200.

Furthermore, as another control operation using the power control message, the wireless power transmitter 100 may perform a typical control operation associated with wireless power transfer based on the power control message. For example, the wireless power transmitter 100 may receive information associated with the wireless power receiver 200 to be auditorily or visually outputted through the power control message, or receive information required for authentication between devices.

In exemplary embodiments, the power transmission control unit 112 may receive the power control message through the wireless power signal. In other exemplary embodiment, the power transmission control unit 112 may receive the power control message through a method for receiving user data.

In order to receive the foregoing power control message, the wireless power transmitter 100 may further include a modulation/demodulation unit 113 electrically connected to the power conversion unit 111. The modulation/demodulation unit 113 may demodulate a wireless power signal that has been modulated by the wireless power receiver 200 and use it to receive the power control message.

In addition, the power transmission control unit 112 may acquire a power control message by receiving user data including the power control message by a communication means (not shown) included in the wireless power transmitter 100.

[For Supporting in-Band Two-Way Communication]

Under a wireless power transfer environment allowing for bi-directional communications according to the exemplary embodiments disclosed herein, the power transmission control unit 112 may transmit data to the wireless power receiver 200. The data transmitted by the power transmission control unit 112 may be transmitted to request the wireless power receiver 200 to send the power control message.

Wireless Power Receiver

Referring to FIG. 2B, the wireless power receiver 200 may include a power supply unit 290. The power supply unit 290 supplies power required for the operation of the wireless power receiver 200. The power supply unit 290 may include a power receiving unit 291 and a power reception control unit 292.

The power receiving unit 291 receives power transferred from the wireless power transmitter 100 in a wireless manner.

The power receiving unit 291 may include constituent elements required to receive the wireless power signal according to a wireless power transfer method. Furthermore, the power receiving unit 291 may receive power according to at least one wireless power transfer method, and in this case, the power receiving unit 291 may include constituent elements required for each method.

First, the power receiving unit 291 may include a coil for receiving a wireless power signal transferred in the form of a magnetic field or electromagnetic field having a vibration characteristic.

For instance, as a constituent element according to the inductive coupling method, the power receiving unit 291 may include a secondary coil to which a current is induced by a changing magnetic field. In exemplary embodiments, the power receiving unit 291, as a constituent element according to the resonance coupling method, may include a coil and a resonant circuit in which resonance phenomenon is generated by a magnetic field having a specific resonant frequency.

In another exemplary embodiments, when the power receiving unit 291 receives power according to at least one wireless power transfer method, the power receiving unit 291 may be implemented to receive power by using a coil, or implemented to receive power by using a coil formed differently according to each power transfer method.

Among the constituent elements included in the power receiving unit 291, those for the inductive coupling method will be described later with reference to FIGS. 4A and 4B, and those for the resonance coupling method with reference to FIGS. 7A and 7B.

On the other hand, the power receiving unit 291 may further include a rectifier and a regulator to convert the wireless power signal into a direct current. Furthermore, the power receiving unit 291 may further include a circuit for protecting an overvoltage or overcurrent from being generated by the received power signal.

The power reception control unit 292 may control each constituent element included in the power supply unit 290.

Specifically, the power reception control unit 292 may transfer a power control message to the wireless power transmitter 100. The power control message may instruct the wireless power transmitter 100 to initiate or terminate a transfer of the wireless power signal. Furthermore, the power control message may instruct the wireless power transmitter 100 to control a characteristic of the wireless power signal.

In exemplary embodiments, the power reception control unit 292 may transmit the power control message through at least one of the wireless power signal and user data.

In order to transmit the foregoing power control message, the wireless power receiver 200 may further include a modulation/demodulation unit 293 electrically connected to the power receiving unit 291. The modulation/demodulation unit 293, similarly to the case of the wireless power transmitter 100, may be used to transmit the power control message through the wireless power signal. The power communications modulation/demodulation unit 293 may be used as a means for controlling a current and/or voltage flowing through the power conversion unit 111 of the wireless power transmitter 100. Hereinafter, a method for allowing the power communications modulation/demodulation unit 113 or 293 at the side of the wireless power transmitter 100 and at the side of the wireless power receiver 200, respectively, to be used to transmit and receive a power control message through a wireless power signal will be described.

A wireless power signal formed by the power conversion unit 111 is received by the power receiving unit 291. At this time, the power reception control unit 292 controls the power communications modulation/demodulation unit 293 at the side of the wireless power receiver 200 to modulate the wireless power signal. For instance, the power reception control unit 292 may perform a modulation process such that a power amount received from the wireless power signal is varied by changing a reactance of the power communications modulation/demodulation unit 293 connected to the power receiving unit 291. The change of a power amount received from the wireless power signal results in the change of a current and/or voltage of the power conversion unit 111 for forming the wireless power signal. At this time, the modulation/demodulation unit 113 at the side of the wireless power transmitter 100 may detect a change of the current and/or voltage to perform a demodulation process.

In other words, the power reception control unit 292 may generate a packet including a power control message intended to be transferred to the wireless power transmitter 100 and modulate the wireless power signal to allow the packet to be included therein, and the power transmission control unit 112 may decode the packet based on a result of performing the demodulation process of the power communications modulation/demodulation unit 113 to acquire the power control message included in the packet.

In addition, the power reception control unit 292 may transmit a power control message to the wireless power transmitter 100 by transmitting user data including the power control message by a communication means (not shown) included in the wireless power receiver 200.

[For Supporting in-Band Two-Way Communication]

Under a wireless power transfer environment allowing for bi-directional communications according to the exemplary embodiments disclosed herein, the power reception control unit 292 may receive data to the wireless power transmitter 100. The data transmitted by the wireless power transmitter 100 may be transmitted to request the wireless power receiver 200 to send the power control message.

In addition, the power supply unit 290 may further include a charger 298 and a battery 299.

The wireless power receiver 200 receiving power for operation from the power supply unit 290 may be operated by power transferred from the wireless power transmitter 100, or operated by charging the battery 299 using the transferred power and then receiving the charged power. At this time, the power reception control unit 292 may control the charger 298 to perform charging using the transferred power.

Hereinafter, description will be given of a wireless power transmitter and a wireless power receiver applicable to the exemplary embodiments disclosed herein. First, a method of allowing the wireless power transmitter to transfer power to the electronic device according to the inductive coupling method will be described with reference to FIGS. 3 through 5.

Inductive Coupling Method

FIG. 3 is a view illustrating a concept in which power is transferred from a wireless power transmitter to an electronic device in a wireless manner according to an inductive coupling method.

When the power of the wireless power transmitter 100 is transferred in an inductive coupling method, if the strength of a current flowing through a primary coil within the power transmission unit 110 is changed, then a magnetic field passing through the primary coil will be changed by the current. The changed magnetic field generates an induced electromotive force at a secondary coil in the wireless power receiver 200.

According to the foregoing method, the power conversion unit 111 of the wireless power transmitter 100 may include a transmitting (Tx) coil 1111a being operated as a primary coil in magnetic induction. Furthermore, the power receiving unit 291 of the wireless power receiver 200 may include a receiving (Rx) coil 2911a being operated as a secondary coil in magnetic induction.

First, the wireless power transmitter 100 and wireless power receiver 200 are disposed in such a manner that the transmitting coil 1111a at the side of the wireless power transmitter 100 and the receiving coil at the side of the wireless power receiver 200 are located adjacent to each other. Then, if the power transmission control unit 112 controls a current of the transmitting coil (Tx coil) 1111a to be changed, then the power receiving unit 291 controls power to be supplied to the wireless power receiver 200 using an electromotive force induced to the receiving coil (Rx coil) 2911a.

The efficiency of wireless power transfer by the inductive coupling method may be little affected by a frequency characteristic, but affected by an alignment and distance between the wireless power transmitter 100 and the wireless power receiver 200 including each coil.

On the other hand, in order to perform wireless power transfer in the inductive coupling method, the wireless power transmitter 100 may be configured to include an interface surface (not shown) in the form of a flat surface. One or more electronic devices may be placed at an upper portion of the interface surface, and the transmitting coil 1111a may be mounted at a lower portion of the interface surface. In this case, a vertical spacing is formed in a small-scale between the transmitting coil 1111a mounted at a lower portion of the interface surface and the receiving coil 2911a of the wireless power receiver 200 placed at an upper portion of the interface surface, and thus a distance between the coils becomes sufficiently small to efficiently implement contactless power transfer by the inductive coupling method.

Furthermore, an alignment indicator (not shown) indicating a location where the wireless power receiver 200 is to be placed at an upper portion of the interface surface. The alignment indicator indicates a location of the wireless power receiver 200 where an alignment between the transmitting coil 1111a mounted at a lower portion of the interface surface and the receiving coil 2911a can be suitably implemented. The alignment indicator may alternatively be simple marks, or may be formed in the form of a protrusion structure for guiding the location of the wireless power receiver 200. Otherwise, the alignment indicator may be formed in the form of a magnetic body such as a magnet mounted at a lower portion of the interface surface, thereby guiding the coils to be suitably arranged by mutual magnetism to a magnetic body having an opposite polarity mounted within the wireless power receiver 200.

On the other hand, the wireless power transmitter 100 may be formed to include one or more transmitting coils. The wireless power transmitter 100 may selectively use some of coils suitably arranged with the receiving coil 2911a of the wireless power receiver 200 among the one or more transmitting coils to enhance the power transmission efficiency. The wireless power transmitter 100 including the one or more transmitting coils will be described later with reference to FIG. 5.

Hereinafter, configurations of the wireless power transmitter and electronic device using an inductive coupling method applicable to the embodiments disclosed herein will be described in detail.

Wireless Power Transmitter and Electronic Device in Inductive Coupling Method

FIGS. 4A and 4B are block diagrams illustrating part of the wireless power transmitter 100 and wireless power receiver 200 in a magnetic induction method that can be employed in the embodiments disclosed herein. A configuration of the power transmission unit 110 included in the wireless power transmitter 100 will be described with reference to FIG. 4A, and a configuration of the power supply unit 290 included in the wireless power receiver 200 will be described with reference to FIG. 4B.

Referring to FIG. 4A, the power conversion unit 111 of the wireless power transmitter 100 may include a transmitting (Tx) coil 1111a and an inverter 1112.

The transmitting coil 1111a may form a magnetic field corresponding to the wireless power signal according to a change of current as described above. The transmitting coil 1111a may alternatively be implemented with a planar spiral type or cylindrical solenoid type.

The inverter 1112 transforms a DC input obtained from the power supply unit 190 into an AC waveform. The AC current transformed by the inverter 1112 drives a resonant circuit including the transmitting coil 1111a and a capacitor (not shown) to form a magnetic field in the transmitting coil 1111a.

In addition, the power conversion unit 111 may further include a positioning unit 1114.

The positioning unit 1114 may move or rotate the transmitting coil 1111a to enhance the effectiveness of contactless power transfer using the inductive coupling method. As described above, it is because an alignment and distance between the wireless power transmitter 100 and the wireless power receiver 200 including a primary coil and a secondary coil may affect power transfer using the inductive coupling method. In particular, the positioning unit 1114 may be used when the wireless power receiver 200 does not exist within an active area of the wireless power transmitter 100.

Accordingly, the positioning unit 1114 may include a drive unit (not shown) for moving the transmitting coil 1111a such that a center-to-center distance of the transmitting coil 1111a of the wireless power transmitter 100 and the receiving coil 2911a of the wireless power receiver 200 is within a predetermined range, or rotating the transmitting coil 1111a such that the centers of the transmitting coil 1111a and the receiving coil 2911a are overlapped with each other.

For this purpose, the wireless power transmitter 100 may further include a detection unit (not shown) made of a sensor for detecting the location of the wireless power receiver 200, and the power transmission control unit 112 may control the positioning unit 1114 based on the location information of the wireless power receiver 200 received from the location detection sensor.

Furthermore, to this end, the power transmission control unit 112 may receive control information on an alignment or distance to the wireless power receiver 200 through the power communications modulation/demodulation unit 113, and control the positioning unit 1114 based on the received control information on the alignment or distance.

If the power conversion unit 111 is configured to include a plurality of transmitting coils, then the positioning unit 1114 may determine which one of the plurality of transmitting coils is to be used for power transmission. The configuration of the wireless power transmitter 100 including the plurality of transmitting coils will be described later with reference to FIG. 5.

On the other hand, the power conversion unit 111 may further include a power sensing unit 1115. The power sensing unit 1115 at the side of the wireless power transmitter 100 monitors a current or voltage flowing into the transmitting coil 1111a. The power sensing unit 1115 is provided to check whether or not the wireless power transmitter 100 is normally operated, and thus the power sensing unit 1115 may detect a voltage or current of the power supplied from the outside, and check whether the detected voltage or current exceeds a threshold value. The power sensing unit 1115, although not shown, may include a resistor for detecting a voltage or current of the power supplied from the outside and a comparator for comparing a voltage value or current value of the detected power with a threshold value to output the comparison result. Based on the check result of the power sensing unit 1115, the power transmission control unit 112 may control a switching unit (not shown) to cut off power applied to the transmitting coil 1111a.

Referring to FIG. 4B, the power supply unit 290 of the wireless power receiver 200 may include a receiving (Rx) coil 2911a and a rectifier 2913.

A current is induced into the receiving coil 2911a by a change of the magnetic field formed in the transmitting coil 1111a. The implementation type of the receiving coil 2911a may be a planar spiral type or cylindrical solenoid type similarly to the transmitting coil 1111a.

Furthermore, series and parallel capacitors may be configured to be connected to the receiving coil 2911a to enhance the effectiveness of wireless power reception or perform resonant detection.

The receiving coil 2911a may be in the form of a single coil or a plurality of coils.

The rectifier 2913 performs a full-wave rectification to a current to convert alternating current into direct current. The rectifier 2913, for instance, may be implemented with a full-bridge rectifier made of four diodes or a circuit using active components.

In addition, the rectifier 2913 may further include a regulator for converting a rectified current into a more flat and stable direct current. Furthermore, the output power of the rectifier 2913 is supplied to each constituent element of the power supply unit 290. Furthermore, the rectifier 2913 may further include a DC-DC converter for converting output DC power into a suitable voltage to adjust it to the power required for each constituent element (for instance, a circuit such as a charger 298).

The power communications modulation/demodulation unit 293 may be connected to the power receiving unit 291, and may be configured with a resistive element in which resistance varies with respect to direct current, and may be configured with a capacitive element in which reactance varies with respect to alternating current. The power reception control unit 292 may change the resistance or reactance of the power communications modulation/demodulation unit 293 to modulate a wireless power signal received to the power receiving unit 291.

On the other hand, the power supply unit 290 may further include a power sensing unit 2914. The power sensing unit 2914 at the side of the wireless power receiver 200 monitors a voltage and/or current of the power rectified by the rectifier 2913, and if the voltage and/or current of the rectified power exceeds a threshold value as a result of monitoring, then the power reception control unit 292 transmits a power control message to the wireless power transmitter 100 to transfer suitable power.

Wireless Power Transmitter Configured to Include One or More Transmitting Coils

FIG. 5 is a block diagram illustrating a wireless power transmitter configured to have one or more transmission coils receiving power according to an inductive coupling method that can be employed in the embodiments disclosed herein.

Referring to FIG. 5, the power conversion unit 111 of the wireless power transmitter 100 according to the embodiments disclosed herein may include one or more transmitting coils 1111a-1 to 1111a-n. The one or more transmitting coils 1111a-1 to 1111a-n may be an array of partly overlapping primary coils. An active area may be determined by some of the one or more transmitting coils.

The one or more transmitting coils 1111a-1 to 1111a-n may be mounted at a lower portion of the interface surface. Furthermore, the power conversion unit 111 may further include a multiplexer 1113 for establishing and releasing the connection of some of the one or more transmitting coils 1111a-1 to 1111a-n.

Upon detecting the location of the wireless power receiver 200 placed at an upper portion of the interface surface, the power transmission control unit 112 may take the detected location of the wireless power receiver 200 into consideration to control the multiplexer 1113, thereby allowing coils that can be placed in an inductive coupling relation to the receiving coil 2911a of the wireless power receiver 200 among the one or more transmitting coils 1111a-1 to 1111a-n to be connected to one another.

For this purpose, the power transmission control unit 112 may acquire the location information of the wireless power receiver 200. For example, the power transmission control unit 112 may acquire the location of the wireless power receiver 200 on the interface surface by the location detection unit (not shown) provided in the wireless power transmitter 100. For another example, the power transmission control unit 112 may alternatively receive a power control message indicating a strength of the wireless power signal from an object on the interface surface or a power control message indicating the identification information of the object using the one or more transmitting coils 1111a-1 to 1111a-n, respectively, and determines whether it is located adjacent to which one of the one or more transmitting coils based on the received result, thereby acquiring the location information of the wireless power receiver 200.

On the other hand, the active area as part of the interface surface may denote a portion through which a magnetic field with a high efficiency can pass when the wireless power transmitter 100 transfers power to the wireless power receiver 200 in a wireless manner. At this time, a single transmitting coil or a combination of one or more transmitting coils forming a magnetic field passing through the active area may be designated as a primary cell. Accordingly, the power transmission control unit 112 may determine an active area based on the detected location of the wireless power receiver 200, and establish the connection of a primary cell corresponding to the active area to control the multiplexer 1113, thereby allowing the receiving coil 2911a of the wireless power receiver 200 and the coils belonging to the primary cell to be placed in an inductive coupling relation.

Furthermore, the power conversion unit 111 may further include an impedance matching unit (not shown) for controlling an impedance to form a resonant circuit with the coils connected thereto.

Hereinafter, a method for allowing a wireless power transmitter to transfer power according to a resonance coupling method will be disclosed with reference to FIGS. 6 through 8.

Resonance Coupling Method

FIG. 6 is a view illustrating a concept in which power is transferred to an electronic device from a wireless power transmitter in a wireless manner according to a resonance coupling method.

First, resonance will be described in brief as follows. Resonance refers to a phenomenon in which amplitude of vibration is remarkably increased when periodically receiving an external force having the same frequency as the natural frequency of a vibration system. Resonance is a phenomenon occurring at all kinds of vibrations such as mechanical vibration, electric vibration, and the like. Generally, when exerting a vibratory force to a vibration system from the outside, if the natural frequency thereof is the same as a frequency of the externally applied force, then the vibration becomes strong, thus increasing the width.

With the same principle, when a plurality of vibrating bodies separated from one another within a predetermined distance vibrate at the same frequency, the plurality of vibrating bodies resonate with one another, and in this case, resulting in a reduced resistance between the plurality of vibrating bodies. In an electrical circuit, a resonant circuit can be made by using an inductor and a capacitor.

When the wireless power transmitter 100 transfers power according to the inductive coupling method, a magnetic field having a specific vibration frequency is formed by alternating current power in the power transmission unit 110. If a resonance phenomenon occurs in the wireless power receiver 200 by the formed magnetic field, then power is generated by the resonance phenomenon in the wireless power receiver 200.

The resonant frequency may be determined by the following formula in Equation 1.

$$f = \frac{1}{2\pi\sqrt{LC}}$$ [Equation 1]

Here, the resonant frequency (f) is determined by an inductance (L) and a capacitance (C) in a circuit. In a circuit forming a magnetic field using a coil, the inductance can be determined by a number of turns of the coil, and the like, and the capacitance can be determined by a gap between the coils, an area, and the like. In addition to the coil, a capacitive resonant circuit may be configured to be connected thereto to determine the resonant frequency.

Referring to FIG. 6, when power is transmitted in a wireless manner according to the resonance coupling method, the power conversion unit 111 of the wireless power transmitter 100 may include a transmitting (Tx) coil 1111b in which a magnetic field is formed and a resonant circuit 1116 connected to the transmitting coil 1111b to determine a specific vibration frequency. The resonant circuit 1116 may be implemented by using a capacitive circuit (capacitors), and the specific vibration frequency may be determined based on an inductance of the transmitting coil 1111b and a capacitance of the resonant circuit 1116.

The configuration of a circuit element of the resonant circuit 1116 may be implemented in various forms such that the power conversion unit 111 forms a magnetic field, and is not limited to a form of being connected in parallel to the transmitting coil 1111b as illustrated in FIG. 6.

Furthermore, the power receiving unit 291 of the wireless power receiver 200 may include a resonant circuit 2912 and a receiving (Rx) coil 2911b to generate a resonance phenomenon by a magnetic field formed in the wireless power transmitter 100. In other words, the resonant circuit 2912 may be also implemented by using a capacitive circuit, and the resonant circuit 2912 is configured such that a resonant frequency determined based on an inductance of the receiving coil 2911b and a capacitance of the resonant circuit 2912 has the same frequency as a resonant frequency of the formed magnetic field.

The configuration of a circuit element of the resonant circuit 2912 may be implemented in various forms such that the power receiving unit 291 generates resonance by a magnetic field, and is not limited to a form of being connected in series to the receiving coil 2911b as illustrated in FIG. 6.

The specific vibration frequency in the wireless power transmitter 100 may have LTX, CTX, and may be acquired by using the Equation 1. Here, the wireless power receiver 200 generates resonance when a result of substituting the LRX and CRX of the wireless power receiver 200 to the Equation 1 is same as the specific vibration frequency.

According to a contactless power transfer method by resonance coupling, when the wireless power transmitter 100 and wireless power receiver 200 resonate at the same frequency, respectively, an electromagnetic wave is propagated through a short-range magnetic field, and thus there exists no energy transfer between the devices if they have different frequencies.

As a result, an efficiency of contactless power transfer by the resonance coupling method is greatly affected by a frequency characteristic, whereas the effect of an alignment and distance between the wireless power transmitter 100 and the wireless power receiver 200 including each coil is relatively smaller than the inductive coupling method.

Hereinafter, the configuration of a wireless power transmitter and an electronic device in the resonance coupling method applicable to the embodiments disclosed herein will be described in detail.

Wireless Power Transmitter in Resonance Coupling Method

FIGS. 7A and 7B are block diagrams illustrating part of the wireless power transmitter 100 and wireless power receiver 200 in a resonance method that can be employed in the embodiments disclosed herein.

A configuration of the power transmission unit 110 included in the wireless power transmitter 100 will be described with reference to FIG. 7A.

The power conversion unit 111 of the wireless power transmitter 100 may include a transmitting (Tx) coil 1111b, an inverter 1112, and a resonant circuit 1116. The inverter 1112 may be configured to be connected to the transmitting coil 1111b and the resonant circuit 1116.

The transmitting coil 1111b may be mounted separately from the transmitting coil 1111a for transferring power according to the inductive coupling method, but may transfer power in the inductive coupling method and resonance coupling method using one single coil.

The transmitting coil 1111b, as described above, forms a magnetic field for transferring power. The transmitting coil 1111b and the resonant circuit 1116 generate resonance when alternating current power is applied thereto, and at this time, a vibration frequency may be determined based on an inductance of the transmitting coil 1111b and a capacitance of the resonant circuit 1116.

For this purpose, the inverter 1112 transforms a DC input obtained from the power supply unit 190 into an AC waveform, and the transformed AC current is applied to the transmitting coil 1111b and the resonant circuit 1116.

In addition, the power conversion unit 111 may further include a frequency adjustment unit 1117 for changing a resonant frequency of the power conversion unit 111. The resonant frequency of the power conversion unit 111 is determined based on an inductance and/or capacitance within a circuit constituting the power conversion unit 111 by Equation 1, and thus the power transmission control unit 112 may determine the resonant frequency of the power conversion unit 111 by controlling the frequency adjustment unit 1117 to change the inductance and/or capacitance.

The frequency adjustment unit 1117, for example, may be configured to include a motor for adjusting a distance between capacitors included in the resonant circuit 1116 to change a capacitance, or include a motor for adjusting a number of turns or diameter of the transmitting coil 1111b to change an inductance, or include active elements for determining the capacitance and/or inductance On the other hand, the power conversion unit 111 may further include a power sensing unit 1115. The operation of the power sensing unit 1115 is the same as the foregoing description.

Referring to FIG. 7B, a configuration of the power supply unit 290 included in the wireless power receiver 200 will be described. The power supply unit 290, as described above, may include the receiving (Rx) coil 2911b and resonant circuit 2912.

In addition, the power receiving unit 291 of the power supply unit 290 may further include a rectifier 2913 for converting an AC current generated by resonance phenomenon into DC. The rectifier 2913 may be configured similarly to the foregoing description.

Furthermore, the power receiving unit 291 may further include a power sensing unit 2914 for monitoring a voltage and/or current of the rectified power. The power sensing unit 2914 may be configured similarly to the foregoing description.

Wireless Power Transmitter Configured to Include One or More Transmitting Coils

FIG. 8 is a block diagram illustrating a wireless power transmitter configured to have one or more transmission coils receiving power according to a resonance coupling method that can be employed in the embodiments disclosed herein.

Referring to FIG. 8, the power conversion unit 111 of the wireless power transmitter 100 according to the embodiments disclosed herein may include one or more transmitting coils 1111b-1 to 1111b-n and resonant circuits (1116-1 to 1116-n) connected to each transmitting coils. Furthermore, the power conversion unit 111 may further include a multiplexer 1113 for establishing and releasing the connection of some of the one or more transmitting coils 1111b-1 to 1111b-n.

The one or more transmitting coils 1111b-1 to 1111b-n may be configured to have the same vibration frequency, or some of them may be configured to have different vibration frequencies. It is determined by an inductance and/or capacitance of the resonant circuits (1116-1 to 1116-n) connected to the one or more transmitting coils 1111b-1 to 1111b-n, respectively.

For this purpose, the frequency adjustment unit 1117 may be configured to change an inductance and/or capacitance of the resonant circuits (1116-1 to 1116-n) connected to the one or more transmitting coils 1111b-1 to 1111b-n, respectively.

In-Band Communication

FIG. 9 a view illustrating the concept of transmitting and receiving a packet between a wireless power transmitter and a wireless power receiver through the modulation and demodulation of a wireless power signal in transferring power in a wireless manner disclosed herein.

As illustrated in FIG. 9, the power conversion unit 111 included in the wireless power transmitter 100 may generate a wireless power signal. The wireless power signal may be generated through the transmitting coil 1111 included in the power conversion unit 111.

The wireless power signal 10a generated by the power conversion unit 111 may arrive at the wireless power receiver 200 so as to be received through the power receiving unit 291 of the wireless power receiver 200. The generated wireless power signal may be received through the receiving coil 2911 included in the power receiving unit 291.

The power reception control unit 292 may control the modulation/demodulation unit 293 connected to the power receiving unit 291 to modulate the wireless power signal while the wireless power receiver 200 receives the wireless power signal. When the received wireless power signal is modulated, the wireless power signal may form a closed-loop within a magnetic field or an electro-magnetic field. This may allow the wireless power transmitter 100 to sense a modulated wireless power signal 10b. The modulation/demodulation unit 113 may demodulate the sensed wireless power signal and decode the packet from the demodulated wireless power signal.

The modulation method employed for the communication between the wireless power transmitter 100 and the wireless power receiver 200 may be an amplitude modulation. As aforementioned, the amplitude modulation is a backscatter modulation may be a backscatter modulation method in which the power communications modulation/demodulation unit 293 at the side of the wireless power receiver 200 changes an amplitude of the wireless power signal 10a formed by the power conversion unit 111 and the power reception control unit 292 at the side of the wireless power transmitter 100 detects an amplitude of the modulated wireless power signal 10b.

Modulation and Demodulation of Wireless Power Signal

Hereinafter, description will be given of modulation and demodulation of a packet, which is transmitted or received between the wireless power transmitter 100 and the wireless power receiver 200 with reference to FIGS. 10, 11A, 11B and 11C.

FIG. 10 is a view illustrating a configuration of transmitting or receiving a power control message in transferring power in a wireless manner disclosed herein, and FIGS. 11A, 11B and 11C are view illustrating forms of signals upon modulation and demodulation executed in the wireless power transfer disclosed herein.

Referring to FIG. 10, the wireless power signal received through the power receiving unit 291 of the wireless power receiver 200, as illustrated in FIG. 11A, may be a non-modulated wireless power signal 51. The wireless power receiver 200 and the wireless power transmitter 100 may establish a resonance coupling according to a resonant frequency, which is set by the resonant circuit 2912 within the power receiving unit 291, and the wireless power signal 51 may be received through the receiving coil 2911b.

The power reception control unit 292 may modulate the wireless power signal 51 received through the power receiving unit 291 by changing a load impedance within the modulation/demodulation unit 293. The modulation/demodulation unit 293 may include a passive element 2931 and an active element 2932 for modulating the wireless power signal 51. The modulation/demodulation unit 293 may modulate the wireless power signal 51 to include a packet, which is desired to be transmitted to the wireless power transmitter 100. Here, the packet may be input into the active element 2932 within the modulation/demodulation unit 293.

Afterwards, the power transmission control unit 112 of the wireless power transmitter 100 may demodulate a modulated wireless power signal 52 through an envelop detection, and decode the detected signal 53 into digital data 54. The demodulation may detect a current or voltage flowing into the power conversion unit 111 to be classified into two phases, a HI phase and a LO phase, and acquire a packet to be transmitted by the wireless power receiver 200 based on digital data classified according to the phases.

Hereinafter, a process of allowing the wireless power transmitter 100 to acquire a power control message to be transmitted by the wireless power receiver 200 from the demodulated digital data will be described.

Referring to FIG. 11B, the power transmission control unit 112 detects an encoded bit using a clock signal (CLK) from an envelope detected signal. The detected encoded bit is encoded according to a bit encoding method used in the modulation process at the side of the wireless power receiver 200. The bit encoding method may correspond to any one of non-return to zero (NRZ) and bi-phase encoding.

For instance, the detected bit may be a differential bi-phase (DBP) encoded bit. According to the DBP encoding, the power reception control unit 292 at the side of the wireless power receiver 200 is allowed to have two state transitions to encode data bit 1, and to have one state transition to encode data bit 0. In other words, data bit 1 may be encoded in such a manner that a transition between the HI phase and LO phase is generated at a rising edge and falling edge of the clock signal, and data bit 0 may be encoded in such a manner that a transition between the HI phase and LO phase is generated at a rising edge of the clock signal.

On the other hand, the power transmission control unit 112 may acquire data in a byte unit using a byte format constituting a packet from a bit string detected according to the bit encoding method. For instance, the detected bit string may be transferred by using an 11-bit asynchronous serial format as illustrated in FIG. 11C. In other words, the detected bit may include a start bit indicating the beginning of a byte and a stop bit indicating the end of a byte, and also include data bits (b0 to b7) between the start bit and the stop bit. Furthermore, it may further include a parity bit for checking an error of data. The data in a byte unit constitutes a packet including a power control message.

[For Supporting in-Band Two-Way Communication]

As aforementioned, FIG. 9 has illustrated that the wireless power receiver 200 transmits a packet using a carrier signal 10a formed by the wireless power transmitter 100. However, the wireless power transmitter 100 may also transmit data to the wireless power receiver 200 by a similar method.

That is, the power transmission control unit 112 may control the modulation/demodulation unit 113 to modulate data, which is to be transmitted to the wireless power receiver 200, such that the data can be included in the carrier signal 10a. Here, the power reception control unit 292 of the wireless power receiver 200 may control the modulation/demodulation unit 293 to execute demodulation so as to acquire data from the modulated carrier signal 10a.

Packet Format

Hereinafter, description will be given of a structure of a packet used in communication using a wireless power signal according to the exemplary embodiments disclosed herein.

FIGS. 12A, 12B and 12C are view illustrating a packet including a power control message used in a contactless (wireless) power transfer method according to the embodiments disclosed herein.

As illustrated in FIG. 12A, the wireless power transmitter 100 and the wireless power receiver 200 may transmit and receive data desired to transmit in a form of a command packet (command_packet) 510. The command packet 510 may include a header 511 and a message 512.

The header 511 may include a field indicating a type of data included in the message 512. Size and type of the message may be decided based on a value of the field which indicates the type of data.

The header 511 may include an address field for identifying a transmitter (originator) of the packet. For example, the address field may indicate an identifier of the wireless power receiver 200 or an identifier of a group to which the wireless power receiver 200 belongs. When the wireless power receiver 200 transmits the packet 510, the wireless power receiver 200 may generate the packet 510 such that the address field can indicate identification information related to the receiver 200 itself.

The message 512 may include data that the originator of the packet 510 desires to transmit. The data included in the message 512 may be a report, a request or a response for the other party.

According to one exemplary embodiment, the command packet 510 may be configured as illustrated in FIG. 12B. The header 511 included in the command packet 510 may be represented with a predetermined size. For example, the header 511 may have a 2-byte size.

The header 511 may include a reception address field. For example, the reception address field may have a 6-bit size.

The header 511 may include an operation command field (OCF) or an operation group field (OGF). The OGF is a value given for each group of commands for the wireless power receiver 200, and the OCF is a value given for each command existing in each group in which the wireless power receiver 200 is included.

The message 512 may be divided into a length field 5121 of a parameter and a value field 5122 of the parameter. That is, the originator of the packet 510 may generate the message by a length-value pair (5121a-5122a, etc.) of at least one parameter, which is required to represent data desired to transmit.

Referring to FIG. 12C, the wireless power transmitter 100 and the wireless power receiver 200 may transmit and receive the data in a form of a packet which further has a preamble 520 and a checksum 530 added to the command packet 510.

The preamble 520 may be used to perform synchronization with data received by the wireless power transmitter 100 and detect the start bit of the header 520. The preamble 520 may be configured to repeat the same bit. For instance, the preamble 520 may be configured such that data bit 1 according to the DBP encoding is repeated eleven to twenty five times.

The checksum 530 may be used to detect an error that can be occurred in the command packet 510 while transmitting a power control message.

Operation Phases

Hereinafter, description will be given of operation phases of the wireless power transmitter 100 and the wireless power receiver 200.

FIG. 13 illustrates the operation phases of the wireless power transmitter 100 and the wireless power receiver 200 according to the embodiments disclosed herein. Furthermore, FIGS. 14 to 18 illustrate the structures of packets including a power control message between the wireless power transmitter 100 and the wireless power receiver 200.

Referring to FIG. 13, the operation phases of the wireless power transmitter 100 and the wireless power receiver 200 for wireless power transfer may be divided into a selection phase (state) 610, a ping phase 620, an identification and configuration phase 630, and a power transfer phase 640.

The wireless power transmitter 100 detects whether or not objects exist within a range that the wireless power transmitter 100 can transmit power in a wireless manner in the selection phase 610, and the wireless power transmitter 100 sends a detection signal to the detected object and the wireless power receiver 200 sends a response to the detection signal in the ping phase 620.

Furthermore, the wireless power transmitter 100 identifies the wireless power receiver 200 selected through the previous phases and acquires configuration information for power transmission in the identification and configuration phase 630. The wireless power transmitter 100 transmits power to the wireless power receiver 200 while controlling power transmitted in response to a control message received from the wireless power receiver 200 in the power transfer phase 640.

Hereinafter, each of the operation phases will be described in detail.

1) Selection Phase

The wireless power transmitter 100 in the selection phase 610 performs a detection process to select the wireless power receiver 200 existing within a detection area. The detection area, as described above, refers to a region in which an object within the relevant area can affect on the characteristic of the power of the power conversion unit 111. Compared to the ping phase 620, the detection process for selecting the wireless power receiver 200 in the selection phase 610 is a process of detecting a change of the power amount for forming a wireless power signal in the power conversion unit at the side of the wireless power transmitter 100 to check whether any object exists within a predetermined range, instead of the scheme of receiving a response from the wireless power receiver 200 using a power control message. The detection process in the selection phase 610 may be referred to as an analog ping process in the aspect of detecting an object using a wireless power signal without using a packet in a digital format in the ping phase 620 which will be described later.

The wireless power transmitter 100 in the selection phase 610 can detect that an object comes in or out within the detection area. Furthermore, the wireless power transmitter 100 can distinguish the wireless power receiver 200 capable of transferring power in a wireless manner from other objects (for example, a key, a coin, etc.) among objects located within the detection area.

As described above, a distance that can transmit power in a wireless manner may be different according to the inductive coupling method and resonance coupling method, and thus the detection area for detecting an object in the selection phase 610 may be different from one another.

First, in case where power is transmitted according to the inductive coupling method, the wireless power transmitter 100 in the selection phase 610 can monitor an interface surface (not shown) to detect the alignment and removal of objects.

Furthermore, the wireless power transmitter 100 may detect the location of the wireless power receiver 200 placed on an upper portion of the interface surface. As described above, the wireless power transmitter 100 formed to include one or more transmitting coils may perform the process of entering the ping phase 620 in the selection phase 610, and checking whether or not a response to the detection signal is transmitted from the object using each coil in the ping phase 620 or subsequently entering the identification phase 630 to check whether identification information is transmitted from the object. The wireless power transmitter 100 may determine a coil to be used for contactless power transfer based on the detected location of the wireless power receiver 200 acquired through the foregoing process.

Furthermore, when power is transmitted according to the resonance coupling method, the wireless power transmitter 100 in the selection phase 610 can detect an object by detecting that any one of a frequency, a current and a voltage of the power conversion unit is changed due to an object located within the detection area.

On the other hand, the wireless power transmitter 100 in the selection phase 610 may detect an object by at least any one of the detection methods using the inductive coupling method and resonance coupling method. The wireless power transmitter 100 may perform an object detection process according to each power transmission method, and subsequently select a method of detecting the object from the coupling methods for contactless power transfer to advance to other phases 620, 630, 640.

On the other hand, for the wireless power transmitter 100, a wireless power signal formed to detect an object in the selection phase 610 and a wireless power signal formed to perform digital detection, identification, configuration and power transmission in the subsequent phases 620, 630, 640 may have a different characteristic in the frequency, strength, and the like. It is because the selection phase 610 of the wireless power transmitter 100 corresponds to an idle state for detecting an object, thereby allowing the wireless power transmitter 100 to reduce consumption power in the idle state or generate a specialized signal for effectively detecting an object.

2) Ping Phase

The wireless power transmitter 100 in the ping phase 620 performs a process of detecting the wireless power receiver 200 existing within the detection area through a power control message. Compared to the detection process of the wireless power receiver 200 using a characteristic of the wireless power signal and the like in the selection phase 610, the detection process in the ping phase 620 may be referred to as a digital ping process.

The wireless power transmitter 100 in the ping phase 620 forms a wireless power signal to detect the wireless power receiver 200, modulates the wireless power signal modulated by the wireless power receiver 200, and acquires a power control message in a digital data format corresponding to a response to the detection signal from the modulated wireless power signal. The wireless power transmitter 100 may receive a power control message corresponding to the response to the detection signal to recognize the wireless power receiver 200 which is a subject of power transmission.

The detection signal formed to allowing the wireless power transmitter 100 in the ping phase 620 to perform a digital detection process may be a wireless power signal formed by applying a power signal at a specific operating point for a predetermined period of time. The operating point may denote a frequency, duty cycle, and amplitude of the voltage applied to the transmitting (Tx) coil. The wireless power transmitter 100 may generate the detection signal generated by applying the power signal at a specific operating point for a predetermined period of time, and attempt to receive a power control message from the wireless power receiver 200.

On the other hand, the power control message corresponding to a response to the detection signal may be a message indicating strength of the wireless power signal received by the wireless power receiver 200. For example, the wireless power receiver 200 may transmit a signal strength packet 5100 including a message indicating the received strength of the wireless power signal as a response to the detection signal as illustrated in FIG. 14. The packet 5100 may include a header 5120 for notifying a packet indicating the signal strength and a message 5130 indicating strength of the power signal received by the wireless power receiver 200. The strength of the power signal within the message 5130 may be a value indicating a degree of inductive coupling or resonance coupling for power transmission between the wireless power transmitter 100 and the wireless power receiver 200.

The wireless power transmitter 100 may receive a response message to the detection signal to find the wireless power receiver 200, and then extend the digital detection process to enter the identification and configuration phase 630. In other words, the wireless power transmitter 100 maintains the power signal at a specific operating point subsequent to finding the wireless power receiver 200 to receive a power control message required in the identification and configuration phase 630.

However, if the wireless power transmitter 100 is not able to find the wireless power receiver 200 to which power can be transferred, then the operation phase of the wireless power transmitter 100 will be returned to the selection phase 610.

3) Identification and Configuration Phase

The wireless power transmitter 100 in the identification and configuration phase 630 may receive identification information and/or configuration information transmitted by the wireless power receiver 200, thereby controlling power transmission to be effectively carried out.

The wireless power receiver 200 in the identification and configuration phase 630 may transmit a power control message including its own identification information. For this purpose, the wireless power receiver 200, for instance, may transmit an identification packet 5200 including a message indicating the identification information of the wireless power receiver 200 as illustrated in FIG. 15A. The packet 5200 may include a header 5220 for notifying a packet indicating identification information and a message 5230 including the identification information of the electronic device. The message 5230 may include information (2531 and 5232) indicating a version of the contract for contactless power transfer, information 5233 for identifying a manufacturer of the wireless power receiver 200, information 5234 indicating the presence or absence of an extended device identifier, and a basic device identifier 5235. Furthermore, if it is displayed that an extended device identifier exists in the information 5234 indicating the presence or absence of an extended device identifier, then an extended identification packet 5300 including the extended device identifier as illustrated in FIG. 15B will be transmitted in a separate manner. The packet 5300 may include a header 5320 for notifying a packet indicating an extended device identifier and a message 5330 including the extended device identifier. When the extended device identifier is used as described above, information based on the manufacturer's identification information 5233, the basic device identifier 5235 and the extended device identifier 5330 will be used to identify the wireless power receiver 200.

The wireless power receiver 200 may transmit a power control message including information on expected maximum power in the identification and configuration phase 630. To this end, the wireless power receiver 200, for instance, may transmit a configuration packet 5400 as illustrated in FIG. 16. The packet may include a header 5420 for notifying that it is a configuration packet and a message 5430 including information on the expected maximum power. The message 5430 may include power class 5431, information 5432 on expected maximum power, an indicator 5433 indicating a method of determining a current of a main cell at the side of the wireless power transmitter, and the number 5434 of optional configuration packets. The indicator 5433 may indicate whether or not a current of the main cell at the side of the wireless power transmitter is determined as specified in the contract for wireless power transfer.

On the other hand, the wireless power transmitter 100 may generate a power transfer contract which is used for power charging with the wireless power receiver 200 based on the identification information and/or configuration information. The power transfer contract may include the limits of parameters determining a power transfer characteristic in the power transfer phase 640.

The wireless power transmitter 100 may terminate the identification and configuration phase 630 and return to the selection phase 610 prior to entering the power transfer phase 640. For instance, the wireless power transmitter 100 may terminate the identification and configuration phase 630 to find another electronic device that can receive power in a wireless manner.

4) Power Transfer Phase

The wireless power transmitter 100 in the power transfer phase 640 transmits power to the wireless power receiver 200.

The wireless power transmitter 100 may receive a power control message from the wireless power receiver 200 while transferring power, and control a characteristic of the power applied to the transmitting coil in response to the received power control message. For example, the power control message used to control a characteristic of the power applied to the transmitting coil may be included in a control error packet 5500 as illustrated in FIG. 18. The packet 5500 may include a header 5520 for notifying that it is a control error packet and a message 5530 including a control error value. The wireless power transmitter 100 may control the power applied to the transmitting coil according to the control error value. In other words, a current applied to the transmitting coil may be controlled so as to be maintained if the control error value is "0," reduced if the control error value is a negative value, and increased if the control error value is a positive value.

The wireless power transmitter 100 may monitor parameters within a power transfer contract generated based on the identification information and/or configuration information in the power transfer phase 640. As a result of monitoring the parameters, if power transmission to the wireless power receiver 200 violates the limits included in the power transfer contract, then the wireless power transmitter 100 may cancel the power transmission and return to the selection phase 610.

The wireless power transmitter 100 may terminate the power transfer phase 640 based on a power control message transferred from the wireless power receiver 200.

For example, if the charging of a battery has been completed while charging the battery using power transferred by the wireless power receiver 200, then a power control message for requesting the suspension of wireless power transfer will be transferred to the wireless power transmitter 100. In this case, the wireless power transmitter 100 may receive a message for requesting the suspension of the power transmission, and then terminate wireless power transfer, and return to the selection phase 610.

For another example, the wireless power receiver 200 may transfer a power control message for requesting renegotiation or reconfiguration to update the previously generated power transfer contract. The wireless power receiver 200 may transfer a message for requesting the renegotiation of the power transfer contract when it is required a larger or smaller amount of power than the currently transmitted power amount. In this case, the wireless power transmitter 100 may receive a message for requesting the renegotiation of the power transfer contract, and then terminate contactless power transfer, and return to the identification and configuration phase 630.

To this end, a message transmitted by the wireless power receiver 200, for instance, may be an end power transfer packet 5600 as illustrated in FIG. 18. The packet 5600 may include a header 5620 for notifying that it is an end power transfer packet and a message 5630 including an end power transfer code indicating the cause of the suspension. The end power transfer code may indicate any one of charge complete, internal fault, over temperature, over voltage, over current, battery failure, reconfigure, no response, and unknown error.

Communication Method of Plural Electronic Devices

Hereinafter, description will be given of a method by which at least one electronic device performs communication with one wireless power transmitter using wireless power signals.

FIG. 19 is a conceptual view illustrating a method of transferring power to at least one wireless power receiver from a wireless power transmitter.

The wireless power transmitter 100 may transmit power to one or more wireless power receivers 200 and 200'. FIG. 19 illustrates two electronic devices 200 and 200', but the methods according to the exemplary embodiments disclosed herein may not be limited to the number of electronic devices shown.

An active area and a detection area may be different according to the wireless power transfer method of the wireless power transmitter 100. Therefore, the wireless power transmitter 100 may determine whether there is a wireless power receiver located on the active area or the detection area according to the resonance coupling method or a wireless power receiver located on the active area or the detection area according to the induction coupling method. According to the determination result, the wireless power transmitter 100 which supports each wireless power transfer method may change the power transfer method for each wireless power receiver.

In the wireless power transfer according to the exemplary embodiments disclosed herein, when the wireless power transmitter 100 transfers power to the one or more electronic devices 200 and 200' according to the same wireless power transfer method, the electronic devices 200 and 200' may perform communications through the wireless power signals without inter-collision.

Referring to FIG. 19, a wireless power signal 10a generated by the wireless power transmitter 100 may arrive at the first electronic device 200' and the second electronic device 200, respectively. The first and second electronic devices 200' and 200 may transmit wireless power messages using the generated wireless power signal 10a.

The first electronic device 200' and the second electronic device 200 may operate as wireless power receivers for receiving a wireless power signal. The wireless power receiver in accordance with the exemplary embodiments disclosed herein may include a power receiving unit 291', 291 to receive the generated wireless power signal, a modulation/demodulation unit 293', 293 to modulate or demodulate the received wireless power signal, and a controller 292', 292 to control each component of the wireless power receiver.

Hereinafter, the same constituent elements as those described in the drawings will be described with the same reference numerals. FIG. 20 is a block diagram illustrating the configuration of a wireless power receiver according to an embodiment of the present disclosure. FIGS. 21A and 21B are circuit diagrams illustrating different circuit structures in a wireless power receiver according to an embodiment of the present disclosure. FIGS. 22 and 23 are conceptual views illustrating a switching mode for power control according to an embodiment of the present disclosure.

In the related art, power received at the wireless power receiver 200 is not controlled by the wireless power receiver 200 itself, but controlled by the wireless power transmitter 100 through communication with the wireless power transmitter 100. In other words, the wireless power receiver 200 transmits power amount information to be received to the wireless power transmitter 100, and the wireless power transmitter 100 transmits wireless power based on the received power amount information.

In this case, the wireless power receiver 200 has inconvenience in which communication with a wireless power communication device should be carried out to control the received power. Furthermore, the wireless power receiver 200 has a problem in which a delay time occurs due to the execution of communication.

Moreover, a many-to-one charging mode (a mode in which one wireless power transmitter charges a plurality of wireless power receivers at the same time) other than a one-to-one charging mode has been developed with the advancement of technology, and the many-to-one mode causes a problem in which it is difficult for one wireless power transmitter to control the power of a plurality of wireless power receivers, respectively.

Accordingly, the present disclosure proposes a method of controlling power in the wireless power receiver 200 itself.

The present disclosure may include a power controller 2921 for changing a resonant frequency of the wireless power receiver to control power received from the wireless power transmitter 100 in the wireless power receiver 200 in addition to the configuration described above in FIG. 2B.

The power controller 2921 may be connected to a power receiving unit 291 configured to receive power in a wireless manner from the wireless power transmitter and a charger 298 configured to perform charging using the power. In other words, as illustrated in FIG. 20, the power controller 2921 may control power received from the power receiving unit 291 to transfer it to the charger 298.

Hereinafter, the configuration and operation mode of the power controller 2921 will be described in more detail with reference to the accompanying drawings.

The power controller 2921 may change a resonant frequency to receive at least part of power received from the power receiving unit 291. More specifically, the power controller 2921 may receive at least part of power received from the power receiving unit 291 to receive preset power and provide it to the charger 298.

To this end, the power controller 2921 may include a first capacitor (C1), a second capacitor (C2), a first switch (M1), a second switch (M2) and a switch controller 2922 configured to control the first and the second switch. Here, the second capacitor (C2), first switch (M1) and second switch (M2) may be referred to as a variable capacitor unit.

The first capacitor and variable capacitor unit may be connected in parallel. When the first capacitor and variable capacitor unit are connected in parallel, the power controller 2921 may have an equivalent capacitor value within a range from a first capacitor value to the sum of the first capacitor value and second capacitor value.

The first and the second capacitor value may be set in advance. Furthermore, the first and the second capacitor may have the same capacitor value or have different capacitor values.

The variable capacitor unit may be configured such that the first and the second switch are connected to the second capacitor in series.

The first and the second switch may use a semiconductor device. For example, the first and the second switch may be a transistor, a field effect transistor (FET), an intelligent power switching (IPS) device, a metal oxide semiconductor field effect transistor (MOSFET), an electronic relay, an insulated gate bipolar transistor (IGBT), or the like.

Furthermore, the first and the second switch may be connected to each other in series to have a bi-directional switching characteristic. The bi-directional switching may denote a characteristic in which a current in a different direction flows through the switch. For example, when an AC current flows through the first and the second switch having the bi-directional switching characteristic, the first switch flows a current in a first direction (for example, a current having a positive value) therethrough, and the second switch flows a current in a second direction (for example, a current having a negative value) therethrough.

The first and the second switch may be arranged in various forms.

For example, as illustrated in FIG. 21A, the first and the second switch may be connected in series to have the bi-directional characteristic. For example, as illustrated in FIG. 21A, the first and the second switch may be disposed in series such that the source ends of PMOS and NMOS are connected to each other.

For another example, as illustrated in FIG. 21B, the first and the second switch may be configured such that the source ends of PMOS and NMOS are connected to different positions. In this case, a unidirectional transistor may be additionally provided between the first and the second switch. In this case, the first and the second source ends may be connected to different positions, thereby having an advantage that the control of switch thereof is more convenient than that of the circuit of FIG. 21A.

The arrangement of the first and the second switch may be implemented in various forms in addition to the foregoing illustrations.

The switch controller 2922 may be connected to the first and the second switch, and control the first and the second switch to change a resonant frequency of the wireless power receiver. Here, the resonant frequency may denote an operating frequency of the wireless power receiver 200.

In other words, the switch controller 2922 may change the resonant frequency of the wireless power receiver 200 to receive only part of power received from the wireless power transmitter 100. For example, when the operating frequency of the wireless power transmitter 100 is a first frequency, the switch controller 2922 may set a second frequency different from the first frequency to a resonant frequency to receive a preset power value, and receive power having the first frequency and at least part of the transmitted power based on the second frequency.

For an example, the switch controller 2922 may change the resonant frequency to be the same as an operating frequency of the wireless power transmitter to receive maximum power. For another example, the switch controller 2922 may set a frequency different from the operating frequency to a resonant frequency to receive a preset amount of power.

Through this, according to the present disclosure, the wireless power receiver 200 may control the received amount of power for itself without performing communication with the wireless power transmitter. Furthermore, the present disclosure may be freed from a frequency regulation issue since it is not required to change an operating frequency of the wireless power transmitter 100. Furthermore, the present disclosure may be advantageous responding to a distribution of coils and capacitors.

Hereinafter, a method of allowing the switch controller 2922 to change a capacitor value according to the control of the first and the second switch will be described with reference to a circuit illustrated in FIG. 21A. However, the present disclosure may be applicable to all various forms of switch arrangement configurations in addition to a circuit illustrated in FIG. 21A.

Referring to FIG. 22, the power controller 2921 flows an AC voltage (Vac) therethrough. Furthermore, a current (Iac) flowing through the power controller 2921 may have a phase difference of 90 degrees from the AC voltage.

Here, the switch controller 2922 may adjust an effective duty of the first and the second switch to change a capacitor value of the power controller 2921. As a parameter associated with a capacitor value, the effective duty may denote a time section having an effect on a change of equivalent capacitor value within a time section in which the switch is turned on. Furthermore, the effective duty may denote a time section in which a current flows through the second capacitor within a time section in which the first and the second switch are turned on. For example, referring to FIG. 22, the effective duty may denote a time section between t2 and t3.

Contrary to the effective duty, a period of switch may denote a time section in which the switch is turned on. For example, referring to FIG. 22, the period of switch may denote a time section between t1 and t3. Here, a current may not flow through the second capacitor during the period of time from t1 to t2. More specifically, a current does not flow through the second capacitor during the period of time from t1 to t2 since a voltage value of the second capacitor is less than that of the first capacitor, and a current flows through the first and the second capacitor during the period of time from t2 to t3 since a voltage value of the second capacitor is the same as that of the first capacitor.

On the other hand, the effective duty and the switch period may have different time sections but may have the same time section.

However, when the effective duty and the switch period are the same, there may be a danger of flowing an overcurrent through the power controller 2921 at a moment when the switch is turned on. To prevent this, the present disclosure may control the first and the second switch to allow the effective duty and the switch period to have different time sections. Controlling the first and the second switch to allow the effective duty and the switch period to have different time sections may be referred to as soft switching. The term soft switching may be changed in various ways by those skilled in the art.

On the other hand, the present disclosure may be applicable in the same manner in case where the effective duty and switch period are the same as well as a case where the effective duty and switch period are different.

More specifically, considering a mode in which the first and the second switch are controlled, the switch controller 2922 may control the first and the second switch based on an effective duty in which the wireless power receiver 200 has a specific equivalent capacitor value.

The specific equivalent capacitor value may be proportional to the length of the effective duty. More specifically, the specific equivalent capacitor value may increase based on the length of the effective duty being lengthened, and decrease based on the length of the effective duty being shortened.

Here, the switch controller 2922 may adjust the specific equivalent capacitor value to control an amount of power received from the wireless power receiver 200. In other words, the switch controller 2922 may detect a specific equivalent capacitor value.

The specific equivalent capacitor value may be detected based on a specific amount of power selected by a user. Furthermore, the specific equivalent capacitor value may be detected based on a charging state of the wireless power receiver 200. For example, the switch controller 2922 may detect an equivalent capacitor value based on the most efficient amount of power received in a current charging state (for example, charging level) of the wireless power receiver 200.

The switch controller 2922 may calculate an effective duty to have the detected equivalent capacitor value. Furthermore, the switch controller 2922 may control either one of the first and the second switch to be open or closed to have the effective duty.

The switch controller 2922 may control the first switch to close the first switch during a section in which the AC voltage value is increased. As illustrated in FIG. 22, the switch controller 2922 may control the first switch to allow a section in which a voltage value of the first capacitor is increased to have an effective duty while containing a section in which a voltage value of the first capacitor becomes zero.

For another example, as illustrated in FIG. 23, the switch controller 2922 may control the first switch to allow at least part of a section in which a voltage value of the first capacitor is increased to have an effective duty while not containing a section in which a voltage value of the first capacitor becomes zero. In this case, the present disclosure may use only a portion having a positive voltage value or negative voltage value of AC voltage received at the power controller 2921.

A time point at which the first switch is closed may be closed at a time point prior to a time point having the effective duty. For example, as illustrated in FIG. 22, when the effective duty is a time section between t2 and t3, the switch controller 2922 may close the first switch at a time point of t1, which is a time point prior to t2. Through this, the present disclosure may prevent overcurrent from flowing through the capacitor due to the switch being instantaneously turned on.

On the other hand, from the time point of t2, the same current as that of the first capacitor may flow through the second capacitor, and a voltage value of the second capacitor may have the same voltage value as that flowing through the first capacitor. Then, at the time point of t3, the first switch may be open. Here, the second capacitor may have a voltage value of Vc2, max at the time point of t3 until either one of the first and the second switch is open.

The first switch is open at the time point of t3, and then a voltage value of the first capacitor, as the same voltage value as that flowing through the power controller 2921, may continuously increase. At this time, a voltage value of the second capacitor may be fixed to a value of Vc2, max.

In a state that the first and the second switch are open, the switch controller 2922 may control the second switch to have an effective duty corresponding to the effective duty of the first switch. In other words, the switch controller 2922 may have the same time section as the effective duty of the first switch during a section in which a voltage value of the first capacitor is decreased, and may close the second switch to have a section with an opposite voltage value.

Furthermore, the switch controller 2922 may close the second switch at a time point at which an absolute value of the voltage of the first capacitor is greater than that of the voltage of the second capacitor to prevent an overcurrent from flowing through the first and the second capacitor. For example, referring to FIG. 22, when the first capacitor has a value of Vc2, max at a time point of t5, the switch controller 2922 may close the second switch at a time point of t4 which is a time point prior the time point of t5. In other words, at the time point of t4, an absolute value of the voltage of the first capacitor may be greater than that of the voltage of the second capacitor.

In this case, a current may flow the second capacitor from the time point of t5 at which the first capacitor has the same voltage value as Vc2, max. In other words, even when the second switch is closed at the time point of t4, a current does not flow through the second capacitor from the time point of t4 to the time point of t5, and may flow from the time point of t5. Then, a voltage value of the second capacitor may be the same as that of the first capacitor from the time point of t5 to a time point of t6 at which the second switch is closed. Through this, the present disclosure may prevent an overcurrent from flowing through the first and the second capacitor.

On the other hand, the switch controller 2922 may open the second switch at a time point of t6 at which a voltage value of the first and the second capacitor becomes Vc2, max. At this time, a voltage value of the second capacitor may be fixed to Vc2, max, and a voltage value of the first capacitor may reduce along with an AC voltage of the power controller 2921.

When either one of the first and the second capacitor is closed, a value of the equivalent capacitor value is a value of the sum of the first and the second capacitor, and when both the first and the second capacitor are open, a value of the equivalent capacitor value becomes a value of the first capacitor.

Through this, the present disclosure may implement a circuit having a capacitor value with a value between a first capacitor value to a value of the sum of the first and the second capacitor. In other words, the present disclosure may implement a variable capacitor only with electrical control.

Furthermore, the present disclosure may change an operating frequency or operating voltage in the related art to control power, thereby solving a problem in the limitation of a frequency range and the distribution of capacitors and inductors.

Furthermore, the present disclosure may control power in a wireless power receiver itself without performing additional communication with a wireless power transmitter, thereby reducing a time required for communication as well as reducing the occurrence of a problem due to a communication error.

Furthermore, the present disclosure may change a resonant frequency to receive only necessary power, thereby providing desired power without having an additional converter (for example, a DC/DC converter) in the wireless power receiver in the related art.

On the other hand, though a method of controlling power using a variable capacitor in the wireless power receiver 200 in the above, the present disclosure may not be necessarily limited to this, and may control power using a variable capacitor with the same manner even in the wireless power transmitter 100.

In this case, the wireless power transmitter 100 may determine an operating frequency based on power information received from the wireless power receiver 200. Moreover, the wireless power transmitter 100 may adjust an effective duty of the first and the second switch to have the determined operating frequency similarly to a control method of the wireless power transmitter 100.

Hereinafter, a method of changing an operating frequency of the wireless power transmitter using a full bridge to control power will be described. FIGS. 24, 25 and 26 are conventional circuit diagrams proposed to change an operating frequency in a wireless power transmitter having a plurality of coils. FIG. 27 is a circuit diagram proposed to change an operating frequency in a wireless power transmitter having a plurality of coils according to the present disclosure. FIGS. 28 and 29 are conceptual views illustrating the driving of the circuit in FIG. 27.

On the other hand, the wireless power transmitter 100 may control power transmitted to the wireless power receiver 200 using a full bridge in addition to the foregoing method of using a variable capacitor. In other words, the wireless power transmitter may include a power transmission unit for switching a full bridge.

The power transmission unit of the wireless power transmitter 100 may include a plurality of coils and a plurality of capacitors. Furthermore, a half bridge or full bridge may be connected to the plurality of coils and capacitors.

The power transmission unit may individually transmit power to a plurality of wireless power receivers using a plurality of coils. In other words, the wireless power transmitter 100 may include a plurality of coils, thereby transmitting power to a plurality of wireless power receivers at the same time or at different times.

The power transmission unit may apply a combination of an operating frequency, a duty cycle and a phase of the power signal to a full bridge, thereby controlling the size of power to be transmitted.

Here, the power transmission unit should be provided with a plurality of inverter topology to control the plurality of coils, respectively. For example, as illustrated in FIG. 24, a full bridge may be connected to the plurality of coils, respectively. Here, when the number of coils is "N", the number of full bridges, N, is also required. Furthermore, the full bridge is configured with four switches, and thus 4N switches are needed when the number of full bridges is "N".

In case of a structure in which an inverter is connected to a plurality of coils, respectively, the structure has no advantages in the aspect of cost and size since it is the same as having the number of wireless power transmitters as many as that of coils.

For another structure to overcome such drawbacks, as illustrated in FIG. 25, it is proposed a structure provided with one full bridge and provided with a switch for a plurality of coils, respectively. Here, the switch is a bi-direction switch. In case of such a structure, the number of switches, 4+2N, is required when the number of coils is "N".

However, in case of the foregoing structure, the power of each coil cannot be controlled though the on/off control of each coil is allowed. In other words, it has a problem that the structure of FIG. 25 is unable to individually control an amount of power transferred by coils. Furthermore, the structure of FIG. 25 additionally requires a natural decay time and an overcurrent prevention algorithm for preventing an overcurrent from flowing through the coils due to the on/off of a bi-directional switch. Furthermore, the structure of FIG. 25 causes a decrease of efficiency due to the switch because of passing through minimum six switches while driving the coils.

For an example of another structure, as illustrated in FIG. 26, a multiplexer may be provided between M-inverters and N-coils. In case of such a structure, each coil may perform control in a separate manner. However, a multiplexer used in this structure may be configured with bi-directional switches, and configured with total 2×N×M switches. Accordingly, there is no advantage in the aspect of the number of switches, but has a problem of decreasing efficiency because of passing through a large number of switches while driving the coils.

As a result, in order to solve the foregoing problems, the present disclosure proposes a structure of FIG. 27. In other words, as illustrated in FIG. 27, for the power transmission unit according to the present disclosure, a sub-half bridge may be connected to a plurality of coils, respectively. Here, a sub-half bridge connected to the each coil may be connected to a main half bridge. The main half bridge may be a half bridge connected to all sub-half bridges connected to each coil. In other words, the main half bridge may be a half bridge to which all the plurality of sub-half bridges connected to each coil are connected to share the function of a main half bridge.

More specifically, the power transmission control unit 112 according to the present disclosure may activate at least one of the plurality of coils to transfer power to the wireless power receiver 200. For example, the power transmission control unit 112 may activate an n-th coil of the plurality of coils.

Here, the selection of the coil to be activated may follow a method disclosed in the WPC standard. For example, the power transmission control unit 112 may activate a coil that has received a response signal to a detection signal for detecting the wireless power receiver among the plurality of coils.

When a coil to be activated is determined from the plurality of coils, the power transmission control unit 112 may control power through a sub-half bridge and a common half bridge connected to the coil to be activated.

More specifically, the power transmission control unit 112 may control an n-th sub-half bridge and main half bridge connected to the n-th coil based on power to be transmitted through the n-th coil. In other words, the 112 may perform a phase shift full bridge control for the n-th coil. Here, power to be transmitted to the n-th coil may be determined by setting information received from the wireless power receiver for receiving wireless power from the n-th coil. The phase shift full bridge control is a method of controlling a phase difference between voltages applied to each half bridge to control power.

Considering the method of controlling power along with FIG. 28 in more detail, the main half bridge may have a reference voltage. The reference voltage is an invariant value, and may be a voltage becoming a reference for a phase difference between voltages over sub-half bridges connected to the coil. For example, referring to FIG. 28, the main half bridge may have a voltage of Vcom. More specifically, the reference voltage may have a size of 9V±5%. Furthermore, an operating frequency of the power transmission unit may be 110±3 kHz (duty: 63 degrees).

The plurality of coils may be coils supporting both inductive mode and resonance mode. In other words, the plurality of coils may perform a power transfer operation based on a mode in which the wireless power receiver receiving wireless power follows. For example, an inductance range of any one of the plurality of coils may has 9.6 μH±10% or 9.5 μH±10%. Furthermore, a resonance capacitor connected to the coil may be 460 nF±5%.

Furthermore, a voltage having a different phase difference based on the reference voltage may be applied to a sub-half bridge connected to the plurality of coils, respectively. In other words, the plurality of coils may control a phase difference of voltage on a sub-half bridge connected to the coil to transfer different power, respectively.

For example, referring to FIG. 28, a first sub-half bridge connected to a first coil among the N-coils may have a voltage of V1. For example, the voltage of V1 may be a voltage having a phase difference of 180 degrees with respect to the reference voltage.

Here, the power transmission control unit 112 may control power through the phase difference between Vcom and V1. For example, when the phase difference between Vcom and V1 is 180 degrees, the power transmission control unit 112 may transmit maximum power.

For another example, as illustrated in FIG. 29, a n-th sub-half bridge connected to an n-th coil of the N-coils may have a voltage of Vn. For example, the voltage of Vn may be a voltage having a phase difference of 90 degrees with respect to the reference voltage.

Here, the power transmission control unit 112 may control power through the phase difference between Vcom and Vn. For example, as illustrated in FIG. 29, when the phase difference between Vcom and Vn is 90 degrees, the power transmission control unit 112 may transmit part of power based on maximum power due to the phase difference of 90 degrees.

The power transmission control unit 112 may control a sub-half bridge connected to the coil such that a sub-half bridge connected to a coil that does not transmit power among the plurality of coils has the reference voltage (Vcom). To this end, the power transmission control unit 112 may turn off both two switches constituting the sub-half bridge to have a voltage of the same phase with respect to the main half bridge. Otherwise, the power transmission control unit 112 may apply a voltage of the same phase with respect to the main half bridge to a sub-half bridge connected to the coil that does not transmit power.

Through this, when the number of coils constituting the power transmission unit is N, the present disclosure may individually control a plurality of coils with only the number of switches, 2N+2. In other words, the present disclosure may individually control each coil, thereby providing different power to a plurality of wireless power receivers, respectively, at the same time.

Furthermore, the present disclosure may reduce the number of switches through the main half bridge, thereby increasing its power efficiency.

Furthermore, the present disclosure may prevent an overcurrent from flowing through an inductor through a body diode included in a switch constituting a sub-half bridge.

However, it would be easily understood by those skilled in the art that the configuration of a wireless power transmitter according to the embodiment disclosed herein may be applicable to an apparatus, such as a docking station, a terminal cradle device, and an electronic device, and the like, excluding a case where it is applicable to only a wireless charger.

The scope of the invention will not be limited to the embodiments disclosed herein, and thus various modifications, variations, and improvements can be made in the present invention without departing from the spirit of the invention, and within the scope of the appended claims.

The invention claimed is:

1. A wireless power transmitter for transmitting power in a wireless manner, the wireless power transmitter comprising:
a power transmission unit having a plurality of coils configured to change a current to a magnetic flux to transmit power in a wireless manner, a plurality of sub-half bridge inverters connected to the plurality of coils, respectively, and a main half bridge inverter connected to all the plurality of sub-half bridge inverters; and
a power transmission controller configured to control at least one coil to transmit power to a wireless power receiver using at least one of the plurality of coils, wherein the power transmission controller performs a full bridge inverter control based on at least one sub-half bridge inverter connected to the at least one coil and the main half bridge inverter.

2. The wireless power transmitter of claim 1, wherein the power transmission controller controls power through a phase difference of voltage for the sub-half bridge inverter based on a reference voltage for the main half bridge inverter.

3. The wireless power transmitter of claim 2, wherein the power transmission controller transmits maximum power to the wireless power receiver when a voltage for the main half bridge inverter and a voltage for the sub-half bridge inverter have a phase difference of 180 degrees.

4. The wireless power transmitter of claim 2, wherein a voltage for the sub-half bridge inverter is determined by an amount of power transmitted from a coil connected to the sub-half bridge inverter.

5. The wireless power transmitter of claim 1, wherein the power transmission controller controls voltages for a plurality of sub-half bridge inverters connected to the at least one coil to have different voltages.

6. The wireless power transmitter of claim 1, wherein the power transmission controller controls a sub-half bridge inverter to allow a voltage for the sub-half bridge inverter connected to a coil that does not transmit power among the plurality of coils to have the same phase as a reference voltage for the main half bridge inverter.

7. The wireless power transmitter of claim 1, wherein the power transmission controller controls the main-half bridge inverter based on a first pulse with modulation (PWM), and controls the sub-half bridge inverter based on a second PWM whose phase is different from the first PWM.

8. The wireless power transmitter of claim 7, wherein the power transmission controller sets the second PWM as an initial PWM when the power transmission controller detects the wireless power receiver.

9. The wireless power transmitter of claim 8, wherein the power transmission controller sets the second PWM as a phase shifted PWM when the power transmission controller transmits power to the wireless power receiver.

10. A control method of wireless power transmitter for transmitting power, the wireless power transmitter including a plurality of coils configured to change a current to a magnetic flux to transmit power in a wireless manner, a plurality of sub-half bridge inverters connected to the plurality of coils, respectively, and a main half bridge inverter connected to all the plurality of sub-half bridge inverters, the method comprising:
performing a full bridge inverter control based on at least one sub-half bridge inverter connected to at least one coil and the main half bridge inverter; and
controlling the at least one coil to transmit power to a wireless power receiver using at least one of the plurality of coils.

11. The method of claim 10, wherein the full bridge inverter control includes controlling power through a phase difference of voltage for the sub-half bridge inverter based on a reference voltage for the main half bridge inverter.

12. The method of claim 11, further comprising:
transmitting maximum power to the wireless power receiver when a voltage for the main half bridge inverter and a voltage for the sub-half bridge inverter have a phase difference of 180 degrees.

13. The method of claim 11, wherein a voltage for the sub-half bridge inverter is determined by an amount of power transmitted from a coil connected to the sub-half bridge inverter.

14. The method of claim 10, wherein the full bridge inverter control includes controlling voltages for a plurality of sub-half bridge inverters connected to the at least one coil to have different voltages.

15. The method of claim 10, wherein the full bridge inverter control includes controlling a sub-half bridge inverter to allow a voltage for the sub-half bridge inverter connected to a coil that does not transmit power among the plurality of coils to have the same phase as a reference voltage for the main half bridge inverter.

16. The method of claim 10, wherein the full bridge inverter control includes controlling the main-half bridge inverter based on a first pulse with modulation (PWM), and controlling the sub-half bridge inverter based on a second PWM whose phase is different from the first PWM.

17. The method of claim 16, wherein the full bridge inverter control includes setting the second PWM as an initial PWM when the power transmission controller detects the wireless power receiver.

18. The method of claim 17, wherein the full bridge inverter control includes setting the second PWM as a phase shifted PWM when the power transmission controller transmits power to the wireless power receiver.

* * * * *